US012582118B2

(12) United States Patent
Yeung et al.

(10) Patent No.: US 12,582,118 B2
(45) Date of Patent: Mar. 24, 2026

(54) ANTIMICROBIAL COATING MATERIAL FOR SURFACE COATING

(71) Applicant: THE HONG KONG UNIVERSITY OF SCIENCE AND TECHNOLOGY, Hong Kong (CN)

(72) Inventors: King Lun Yeung, Hong Kong (CN); Yue Tak Lai, Hong Kong (CN); Wei Han, Hong Kong (CN); Ying Li, Hong Kong (CN); Yan Li, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 789 days.

(21) Appl. No.: 17/864,524

(22) Filed: Jul. 14, 2022

(65) Prior Publication Data
US 2023/0157277 A1 May 25, 2023

Related U.S. Application Data

(63) Continuation-in-part of application No. 15/512,322, filed on Mar. 17, 2017, now abandoned.

(51) Int. Cl.
*A01N 25/28* (2006.01)
*A01N 25/10* (2006.01)
(Continued)

(52) U.S. Cl.
CPC ............. *A01N 25/28* (2013.01); *A01N 25/10* (2013.01); *A01N 25/34* (2013.01); *A01N 59/00* (2013.01);
(Continued)

(58) Field of Classification Search
None
See application file for complete search history.

(56) References Cited

U.S. PATENT DOCUMENTS 7,377,968 B2    5/2008   Reybuck et al.
2002/0157419 A1 * 10/2002   Ganguli ................... C03C 3/06
                                                                    65/17.2
(Continued)

FOREIGN PATENT DOCUMENTS

CN          101037554 A     9/2007
CN          102137900 A     7/2011
(Continued)

OTHER PUBLICATIONS

The Hong Kong University of Science and Technology. "HKUST Alumni Join Fight Against COVID-10 with Antimicrobial Technology." https://cbe.hkust.edu.hk/news/hkust-alumni-join-fight-against-covid-19-antimicrobial-technology accessed May 27, 2025, originally published May 31, 2020, pp. 1-6. (Year: 2020).*
(Continued)

*Primary Examiner* — Isaac Shomer
(74) *Attorney, Agent, or Firm* — Nath, Goldberg & Meyer; Joshua B. Goldberg

(57) ABSTRACT

The antimicrobial coating material for surface coating is formed from encapsulated biocides. The biocides include at least one antimicrobial component. The biocides are encapsulated in inorganic-organic shells which are permeable to the biocides. The organic materials may include at least one nonionic polymer. The inorganic-organic shells encapsulate and contain the biocides to form capsule structures for storage and release of the biocides. The capsule structures may be single capsules or capsule-in-capsule structures. The inorganic materials may be present in a concentration of 0.5-95 wt % of the inorganic-organic shells. Alternatively, the inorganic materials may be present in a concentration of 5-60 wt %. The inorganic materials and the organic materials are each intermixed, with respect to one another, in structures of the inorganic-organic shells. These structures may
(Continued)

be an attachment structure, a hybrid structure or a multi-layered structure.

14 Claims, 45 Drawing Sheets

(51) Int. Cl.

| | | |
|---|---|---|
| *A01N 25/34* | (2006.01) | |
| *A01N 59/00* | (2006.01) | |
| *A01N 65/22* | (2009.01) | |
| *A01N 65/28* | (2009.01) | |
| *A01P 1/00* | (2006.01) | |

(52) U.S. Cl.
CPC ............. *A01N 65/22* (2013.01); *A01N 65/28* (2013.01); *A01P 1/00* (2021.08)

(56) References Cited

U.S. PATENT DOCUMENTS

| | | | |
|---|---|---|---|
| 2006/0034924 A1* | 2/2006 | Wyrsta ................. | A61K 9/2031 424/468 |
| 2008/0147019 A1 | 6/2008 | Song et al. | |
| 2008/0175812 A1 | 7/2008 | Seabrook et al. | |
| 2010/0068087 A1* | 3/2010 | Saveker .............. | C22C 33/0228 366/139 |
| 2010/0158851 A1* | 6/2010 | Yeung ................... | A01N 59/16 424/641 |
| 2011/0206746 A1* | 8/2011 | Hagar ................ | B01J 20/28059 424/49 |
| 2011/0306501 A1 | 12/2011 | Dreher et al. | |
| 2012/0039965 A1* | 2/2012 | Van Beek ............... | A61P 31/04 424/739 |
| 2017/0275472 A1* | 9/2017 | Yeung ................... | A01N 65/22 |

FOREIGN PATENT DOCUMENTS

| | | | |
|---|---|---|---|
| CN | 102407088 A | 4/2012 | |
| JP | 2000177048 A | 6/2000 | |
| TW | 201330877 A1 | 8/2013 | |
| WO | 2009062518 A1 | 5/2009 | |
| WO | 2010069152 A1 | 6/2010 | |
| WO | 2013087405 A2 | 6/2013 | |

OTHER PUBLICATIONS

Werner Stober, Arthur Fink, and Ernst Born. "Controlled Growth of Monodisperse Silica Spheres win the Micron Size Range." Journal of Colloid and Interface Science, vol. 26, 1968, pp. 62-69. (Year: 1968).*

Tine Curk, Francisco J. Martinez-Veracoechea, Daan Frenkel, and Jure Dobnikar. "Nanoparticle Organization in Sandwiched Polymer Brushes." Nano Letters, vol. 14, 2014, pp. 2617-2622. (Year: 2014).*

X Hong, X Zhang, X Chen, Y Liu, F Liu, and Y Bai. "Preparation and Characteristics of Sandwiched Polymer/Magnetic Particles/ Polymer Magnetic Nanomicrospheres." International Journal of Nanoscience, vol. 1, Nos. 5 & 6, 2002, pp. 701-705. (Year: 2002).*

Patent Trial and Appeal Board. Decision for Appeal No. 2021-003955, U.S. Appl. No. 15/512,322. Published May 24, 2022. pp. 1-11 and an additional cover sheet. (Year: 2022).*

Materials Safety Data Sheet for Germagic. Obtained from https:// www.germagic.com/download/GERMAGIC_MSDS.pdf on May 27, 2025. Originally published Dec. 12, 2017, 6 printed pages. (Year: 2017).*

Patent Trial and Appeal Board. Decision for Appeal No. 2021-003955, U.S. Appl. No. 15/512,322. Published May 24, 2022. pp.s 1-11 and an additional cover sheet. (Year: 2022).*

Examiner's Answer in case U.S. Appl. No. 15/512,322. Published Feb. 10, 2021, pp. 1-14. (Year: 2021).*

* cited by examiner

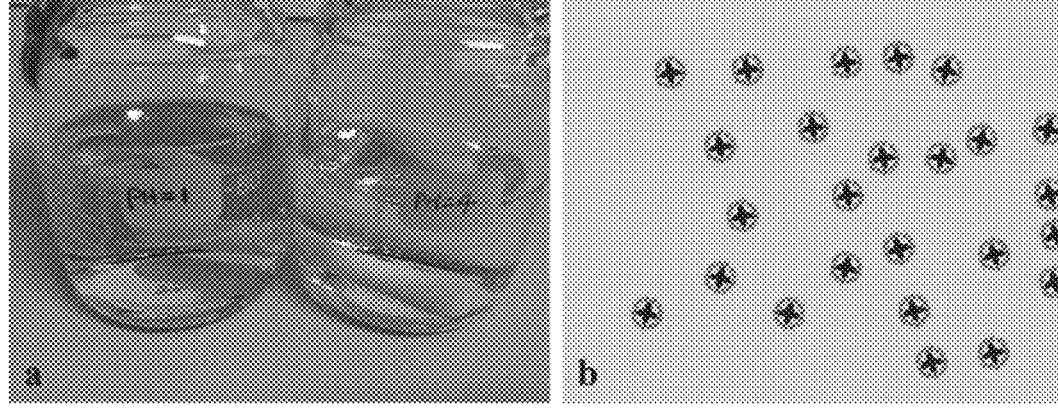
FIG. 2A                    FIG. 2B
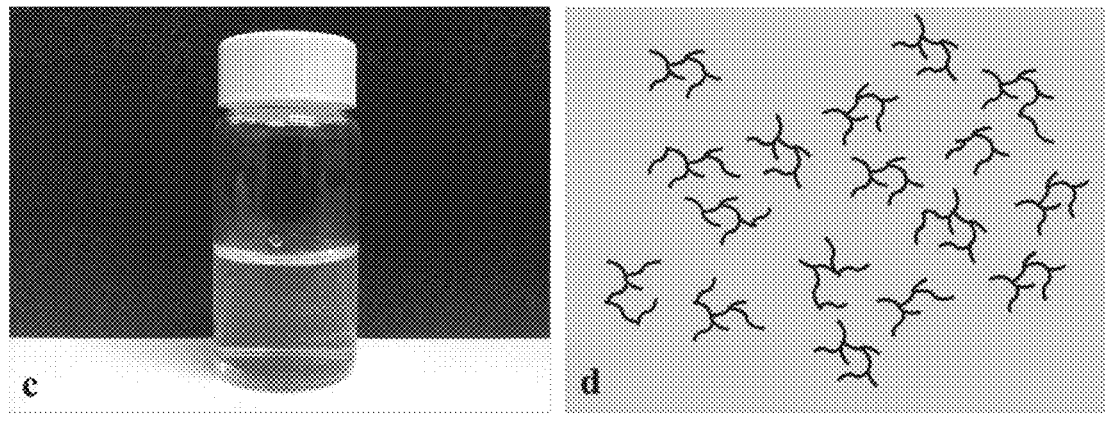
FIG. 2C                    FIG. 2D

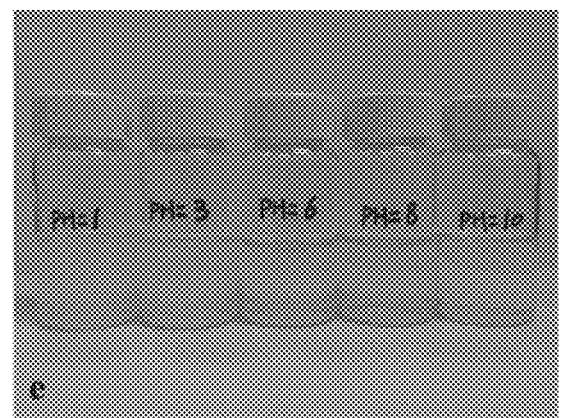
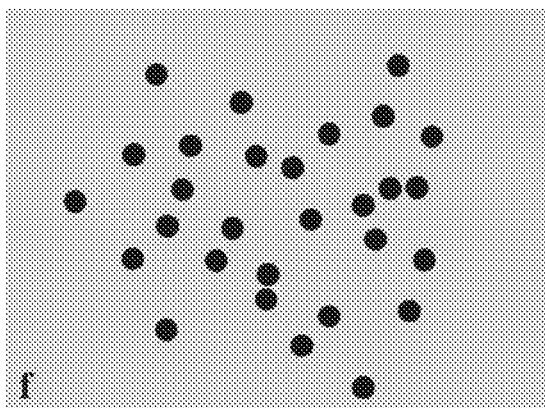
FIG. 2E                    FIG. 2F
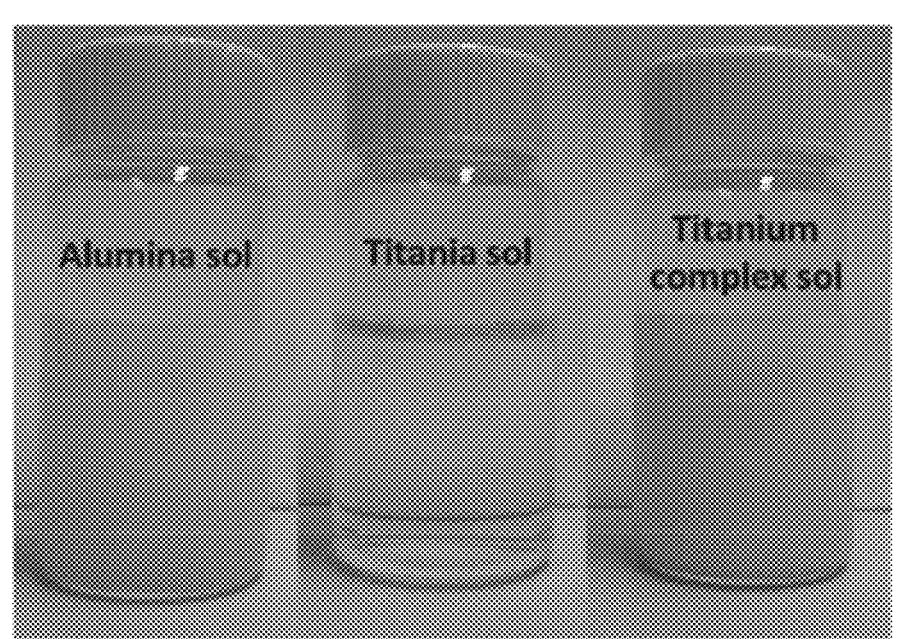
FIG. 3

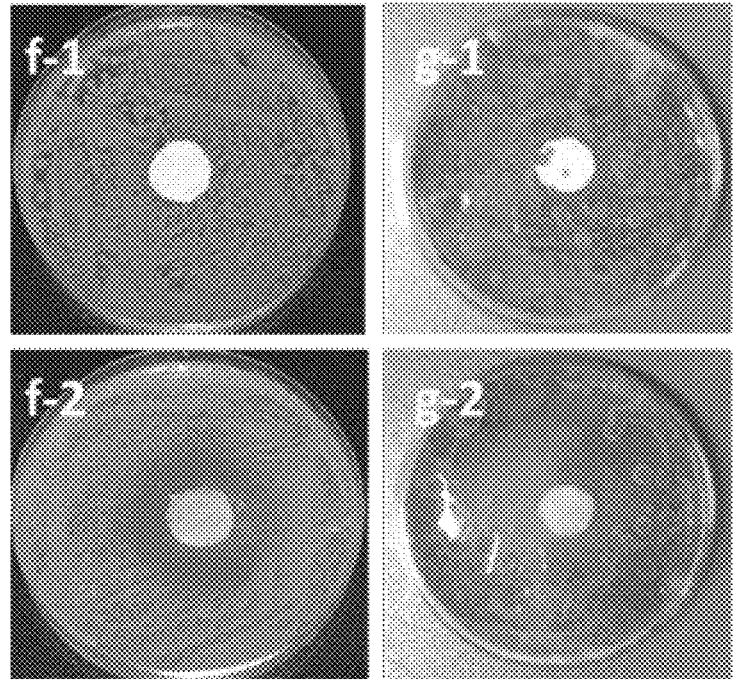
FIG. 14F                    FIG. 14G

ANTIMICROBIAL COATING MATERIAL FOR SURFACE COATING

CROSS-REFERENCE TO RELATED APPLICATION

This application is a continuation-in-part of U.S. patent application Ser. No. 15/512,322, filed on Mar. 17, 2017, which is a National Phase Application filed under 35 U.S.C. § 371 as a national stage of PCT Application No. PCT/CN2015/089621, filed on Sep. 15, 2015, which claimed the benefit of U.S. Provisional Application No. 62/071,276, filed on Sep. 19, 2014, the content of each of which is hereby incorporated by reference in its entirety.

BACKGROUND

1. Field

The disclosure of the present patent application relates to materials possessing a combination of release-killing, contact-killing and anti-adhesion antimicrobial properties and methods of making the same, as well as to the physicochemical properties and methods of use thereof for long-term disinfection of solid and porous surfaces.

2. Description of the Related Art

According to a World Health Organization report, airborne and waterborne pathogens, such as tuberculosis, lower respiratory infections and pulmonary infections, are among the top ten causes of death around world, accounting for millions of deaths per year. Currently, filtration technology remains the most effective and economical means for air and water purification and disinfection. However, a known problem with conventional filtration technology is the fact that microbes trapped in filters remain viable to the extent that they can grow in and colonize the filter. For example, in an air filter, the warm and humid environment encourages microbial growth and presents a two-fold problem: not only is filter performance degraded, but the colonization also poses a clear risk of contamination of the air by the same pathogenic bacteria, viruses and fungi that the filter is designed to eliminate. A further known problem of conventional filtration technology is the ability of ultra-small cells and viruses to penetrate the filter material.

Certain solutions attempt to address the problem of microbial colonization, contamination and fouling in air and water filters. Some examples in this regard are the addition of a photocatalyst, the addition of biocidal metal, such as silver nanoparticles, or a metal oxide, such as zinc oxide nanoparticles, the addition of other biocides in the filtration media, such as biostat, organic quaternary ammonium salt, phenol derivatives and isothiazolin-based compounds, and combining irradiation technologies with the filtration process, such as ultraviolet (UV) light, magnetic or electric fields, plasma and polarization.

These solutions present various drawbacks. For example, photocatalytic disinfection requires an additional light source, is slow, sensitive to humidity and is vulnerable to surface contamination. The use of silver nanoparticles increases the material and manufacturing costs. Furthermore, widespread use and misuse of antimicrobial silver is responsible for the emergence of silver-tolerant and resistant bacteria. Though irradiation treatments are relatively safe and disinfect rapidly, the additional electrical devices and electricity result in higher device and disinfection costs. For these reasons, the manufacturability, safety and long-term stability of filters using ancillary technologies and those including natural and synthetic biocides remain a concern. Thus, an antimicrobial coating material for surface coating solving the aforementioned problems is desired.

SUMMARY

The antimicrobial coating material for surface coating is formed from encapsulated biocides. The biocides include at least one antimicrobial component which may be, as non-limiting examples, chlorine dioxide, hydrogen peroxide, peroxy acids, alcoholic compounds, phenolic compounds, essential oils, antimicrobial components of essential oils, bleach, antimicrobial phytochemicals, or combinations thereof. The biocides are encapsulated in inorganic-organic shells which are permeable to the biocides. The inorganic materials may be, as non-limiting examples, titania sol, titanium peroxo complex sol, silica sol, alumina sol or combinations thereof. The organic materials may include at least one nonionic polymer.

The inorganic-organic shells encapsulate and contain the biocides to form capsule structures for storage and release of the biocides. The capsule structures may be single capsules or capsule-in-capsule structures. The inorganic materials may be present in a concentration of 0.5-95 wt % of the inorganic-organic shells. Alternatively, the inorganic materials may be present in a concentration of 5-60 wt %.

The inorganic materials and the organic materials are each intermixed, with respect to one another, in structures of the inorganic-organic shells. These structures may be an attachment structure, a hybrid structure or a multi-layered structure. The attachment structure is formed as an organic shell formed from the organic materials with the inorganic materials uniformly dispersed in the organic shell. The attachment structure is formed when the inorganic materials have a very low concentration. In this structure, the inorganic materials are formed as isolated units, such as nanoparticles, which are dispersed into the organic material shells.

The hybrid structure is formed as a network of the inorganic materials interpenetrating a network of the organic materials. The hybrid structure forms when the concentration of the inorganic materials is greater than in the attachment structure. As the concentration of the inorganic materials increases, the inorganic materials form continuous or semi-continuous morphologies, rather than the isolated units of the attachment structure. The inorganic network is formed from these morphologies. The organic materials also form a network, similar to the organic shell of the attachment structure. The two networks, however, do not form a multi-layer structure; i.e., the structure does not exhibit layer-layer contact. In the hybrid structure, the inorganic material network and the organic material network are mixed/interpenetrated to form inorganic-organic shells. The inorganic materials may penetrate into the organic network in the radial direction, for example, or in a random direction, as another example. In contrast, the multi-layered structure is formed from at least one layer of the organic materials sandwiched between adjacent layers of the inorganic materials.

An antimicrobial coating material for application to porous materials or porous media is made by preparing a biocide mixture, which may include, for example, the biocides discussed above. A suspension or a solution of nonionic polymers and inorganic materials is prepared, where the inorganic materials may be, as non-limiting examples, metal oxides, metal complexes, metal salts, metal particles or combinations thereof. A stable sol suspension is prepared from the biocide mixture encapsulated within inorganic-organic shells. The inorganic-organic shells are formed from the suspension or the solution of the nonionic polymer and the inorganic material. The stable sol suspension forms the antimicrobial coating material, which may then be applied on a porous material or in a porous medium.

These and other features of the present subject matter will become readily apparent upon further review of the following specification.

BRIEF DESCRIPTION OF THE DRAWINGS

FIG. 2A shows a silica sol prepared from water soluble silica.

FIG. 2B shows the structural representation of the silica sol of FIG. 2A.

FIG. 2C shows a silica sol prepared from silicon alkoxide.

FIG. 2D shows the structural representation of the silica sol of FIG. 2C.

FIG. 2E shows a silica sol prepared from colloidal silica.

FIG. 2F shows the structural representation of the silica sol of FIG. 2E.

FIG. 3 shows different metal oxide and metal complex materials, including boehmite alumina sol, titania sol and titanium peroxo complex sol.

FIG. 14F shows a side-by-side comparison of inhibition zone tests for *B. subtilis* on 1) uncoated HEPA filters and 2) HEPA filters coated with polymer-encapsulated $ClO_2$ capsules enclosed within outermost $SiO_2$-polymer shells.

FIG. 14G shows a side-by-side comparison of inhibition zone tests for *Cladosporium* spores on 1) uncoated HEPA filters and 2) HEPA filters coated with polymer-encapsulated $ClO_2$ capsules enclosed within outermost $SiO_2$-polymer shells.

$$and \ 2 \ SiO_2 \ layers \left(210 \ nm, \left(\frac{m_{SiO_2}}{m_{SiO_{2,0}}}\right) = 1.5\right).$$

Figure 24A:
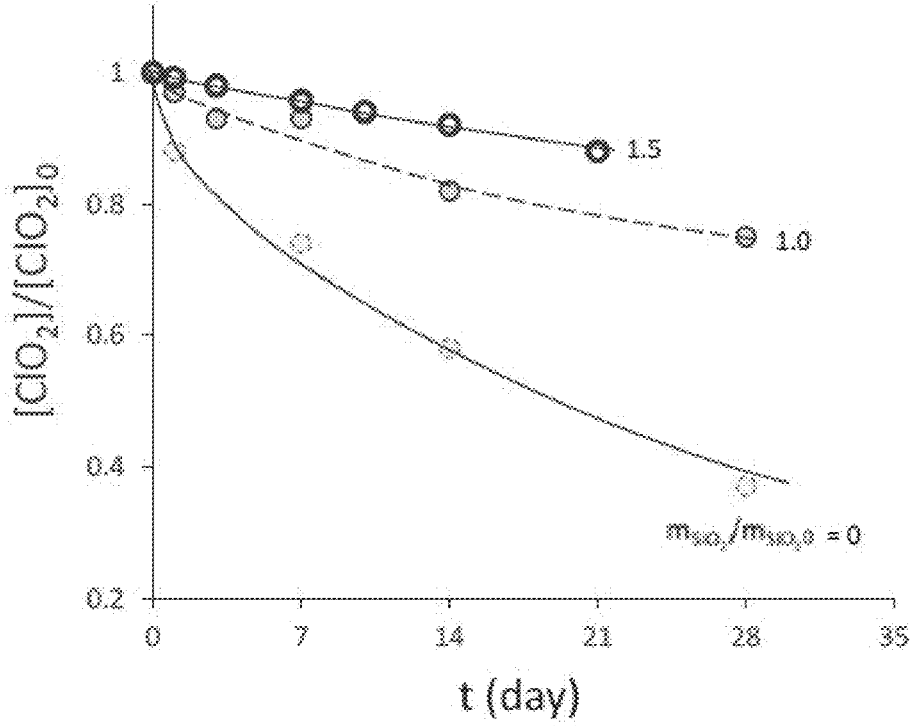
FIG. 24A is a plot of the room temperature release profile of chlorine dioxide without a silica layer $$\left(\frac{m_{SiO_2}}{m_{SiO_{2,0}}}\right) = 0, \ 1 \ SiO_2 \ layer \left(100 \ nm, \left(\frac{m_{SiO_2}}{m_{SiO_{2,0}}}\right) = 1\right),$$
Figure 24B:
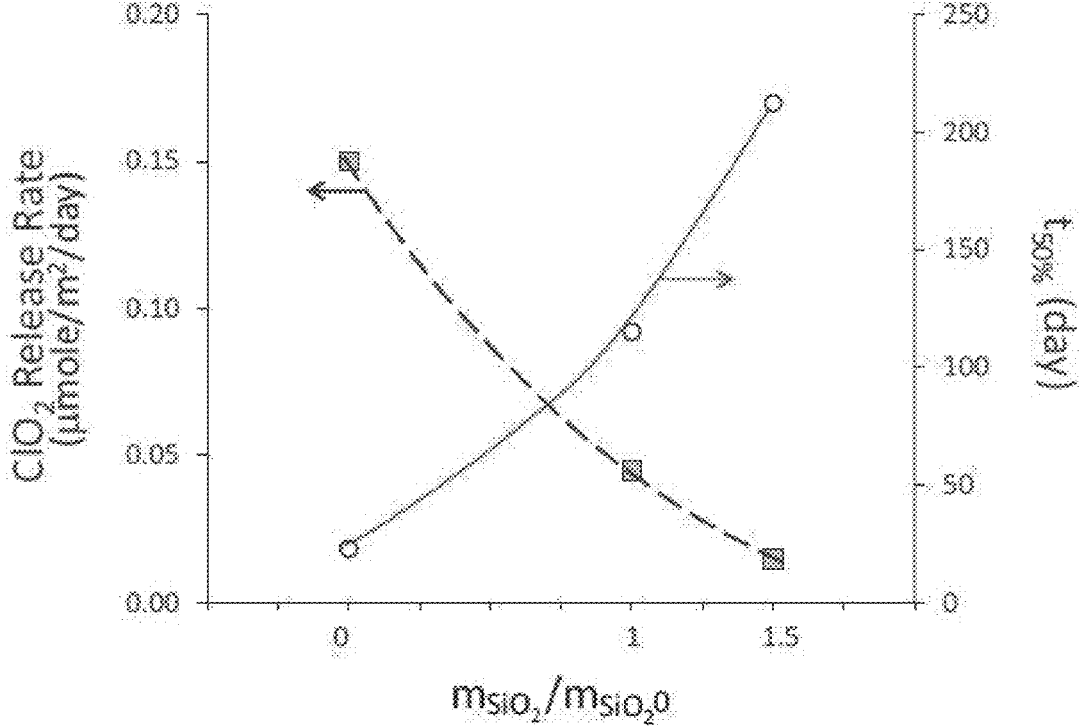

FIG. 24B is a plot of the room temperature release rate of chlorine dioxide and the half-life estimated by accelerated aging for 0, 1 and 2 $SiO_2$ encapsulating layers.

Figure 24C:
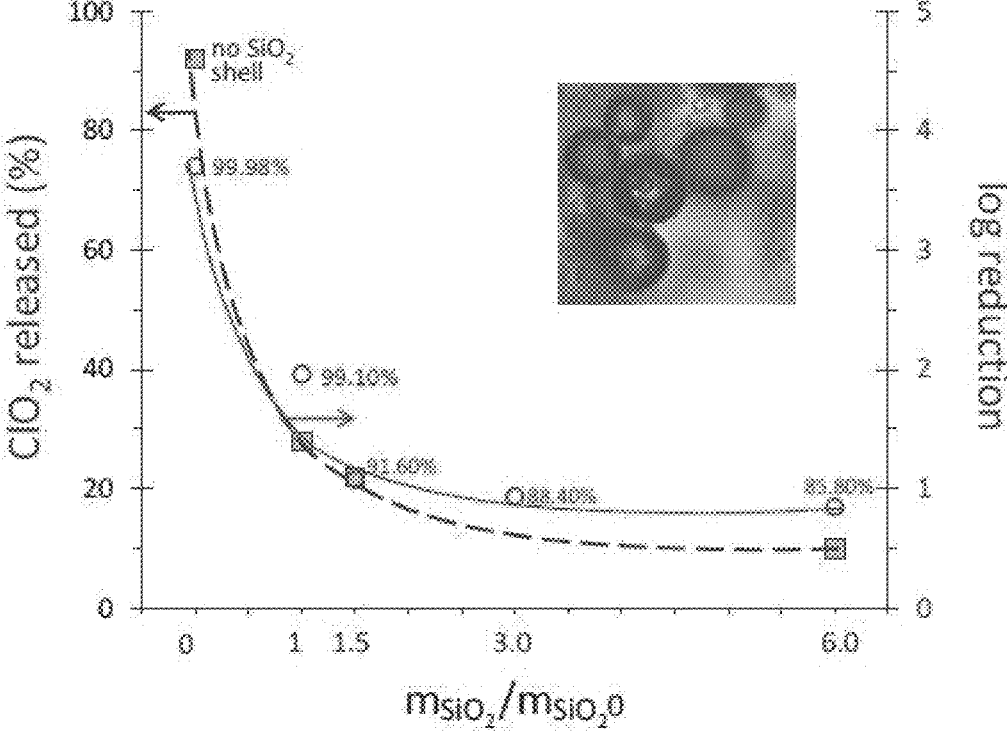

FIG. 24C is a plot of the percent stored chlorine dioxide released after 7 days of accelerated aging at 50° C. and the corresponding bactericidal properties against *S. aureus* for 10 minutes of contact time.

Similar reference characters denote corresponding features consistently throughout the attached drawings.

7

DETAILED DESCRIPTION OF THE PREFERRED EMBODIMENTS

The present subject matter relates to biocidal materials having a combination of contact and time-release biocide properties. The materials are capable of providing both antimicrobial and anti-adhesion properties. The materials are specifically designed for incorporation into filtration systems, for example, air and water filters. Specifically, the subject matter relates to an antimicrobial coating for porous materials or porous media, including a colloidal encapsulation structure with gaseous, volatile, semi-volatile and/or non-volatile biocides enclosed with inorganic-organic shells permeable to the biocides. As discussed herein, the coatings of the present subject matter including various components; i.e., the coatings include at least the recited components. However, it is also contemplated that the coatings include only the various recited components.

The biocides may be, but are not limited to, chlorine dioxide, hydrogen peroxide, peroxy acids, alcoholic and phenolic compounds, essential oils and their effective components, and combinations thereof, as well as any commercially available biocides, such as bleach, antibiotics, antimicrobial phytochemicals, and combinations thereof. Examples of essential oils are, but are not limited to, thyme oil, tea tree oil, rosemary oil, eucalyptus oil, citral oil, their effective, antimicrobial components and other essential oils with antimicrobial activity. The essential oils may be diluted with solvents. Suitable solvents are, but are not limited to, ethylene glycol, propylene glycol, glycerol, dipropylene glycol, polyethylene glycol, and combinations thereof.

The inorganic-organic shell includes organic materials and inorganic materials that account for at least 0.5 wt % of the shell materials. Examples of the organic materials are, but are not limited to, nonionic polymers, such as polyethylene glycol, polyvinyl alcohol, polyvinylpyrrolidone, polyetherimide, polyethyleneimine and combinations thereof. Specific nonionic polymers are, but are not limited to, poly(ethylene oxide)-poly(propylene oxide)-poly(ethylene oxide), poly(ethylene glycol)-poly(propylene glycol)-poly(ethylene glycol), other amphiphilic block copolymers, and combinations thereof. The inorganic materials are present in a concentration of 0.5-95 wt % of the inorganic-organic shells. Alternatively, the inorganic materials may be present in a concentration of 5-60 wt %. The inorganic materials are, but are not limited to, metal oxides, metal complexes, metal salts, metal particles and combinations thereof.

The addition of inorganic materials into the inorganic-organic shells improves the durability and performance of the antimicrobial coatings, particularly above room temperature. The metal oxides are, but are not limited to, alumina sol, copper oxide sol, silica sol, silver oxide sol, titania sol, zinc sol, zirconia sol and combinations thereof. The metal oxide sol may be derived from a water-soluble metal salt, a metal alkoxide or commercially available colloidal metal oxides The metal complexes are, but are not limited to, complexes of metals, such as silver, copper, zinc and combinations thereof. The metal complex may be derived from water-soluble metal salts and metal hydroxides. The metal salts are, but are not limited to, nitrates, sulfates and halides of silver, copper, zinc and combinations thereof. The metal particles include, but are not limited to, silver, copper, zinc and combinations thereof.

Regarding the use of amphiphilic block copolymers in the inorganic-organic shell, it is important to note these are nonionic and are used in conjunction with inorganic mate-

Figure 1:
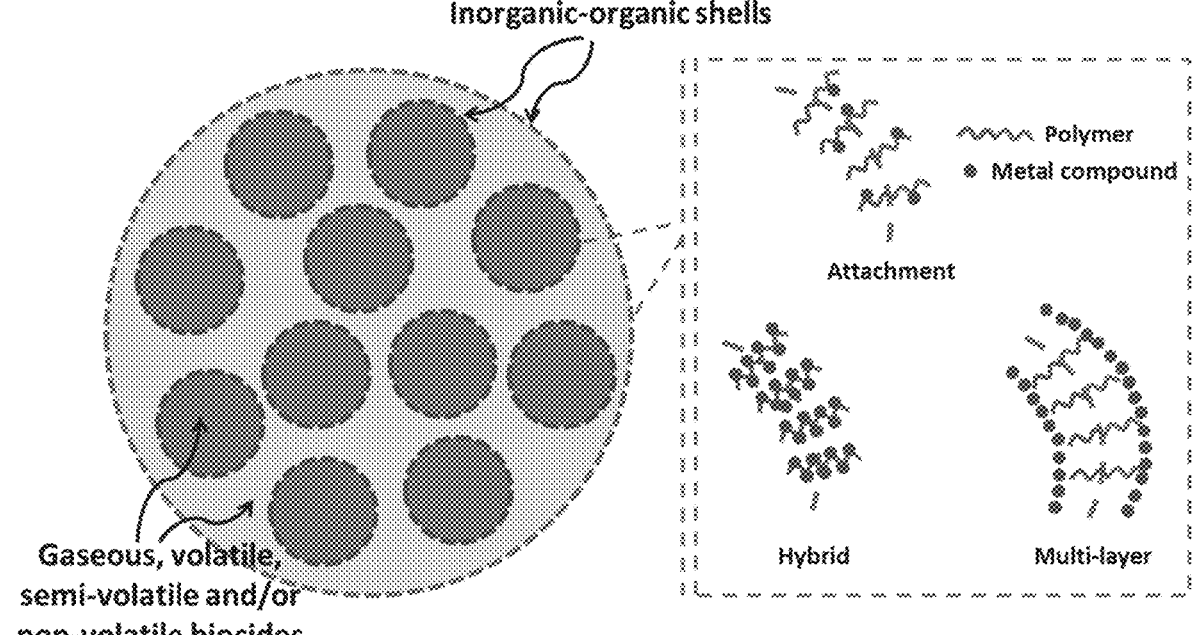
FIG. 1 is a schematic drawing of the encapsulated structure of the antimicrobial material based on encapsulation of gaseous, volatile, semi-volatile and/or non-volatile biocides within inorganic-organic capsules.

8 rials, as shown in FIG. 1. Thus, the volatile or semi-volatile biocides according to the present subject matter are not enclosed in only an amphiphilic block copolymer but specifically in an inorganic-organic shell.

It is important to note that the inorganic materials, according to the present subject matter, for example metals, metal oxides, metal complexes, and combination thereof, are employed as part of the inorganic-organic shells and are not used as biocides themselves. This is shown in the below Examples, where the metals function as part of the inorganic-organic shell and not as a biocide.

It is important to note that when the inorganic material is a silica sol, the precursor is a sodium silicate solution. Furthermore, insofar as the present inorganic-organic shell possesses a three-dimensional nature, use of silica or silica sol according to the present subject matter does not result in the formation of a three dimensional silica network.

Production of the present subject matter does not require sequential steps. In general, the antimicrobial material is prepared by storing the biocide mixture in the core of a shell made from a combination of an inorganic component of metal oxides, metal complexes, metal salts or metal particles, or combinations thereof, with an organic component, which is preferably made from nonionic polymers. Specifically, this is performed by mixing the biocide mixture with the prepared inorganic-organic mixture under required pH, concentration and temperature to induce the encapsulation of the biocide within an inorganic-organic shell. For example, chlorine dioxide dissolved in water solution containing hydrogen peroxide can be encapsulated within an inorganic-organic shell made of silica and polymer at room temperature and neutral pH. A mixture of phenolic compounds in essential oil is encapsulated within an inorganic-organic shell made of a metal compound and polymer at room temperature. Further encapsulation can be performed to create capsule-in-capsule structures to better control the release dosing of the biocides.

The present antimicrobial materials can be coated on surfaces by wiping, brushing, casting, dip-coating, spin-coating or spraying. The resulting antimicrobial coating exhibits the advantages of the different components, displaying a multi-level, wide-spectrum and durable antimicrobial performance at a broad range of temperatures. Further, the present coatings are employed in methods for preparing a porous antimicrobial object, as well as providing additional multi-level antimicrobial activity to a porous object without changing its pore-related properties and functions. In other words, the porous material will function as originally intended with the added benefit and result of the coating as described herein.

The biocide mixtures were prepared from one or more gaseous, volatile, semi-volatile and/or non-volatile biocides. The biocides include disinfectants, germicides and antimicrobial volatile or semi-volative phytochemicals (VSPs). The typical embodiments include chlorine dioxide, hydrogen peroxide, peroxy acids, alcoholic, bleach and phenolic compounds, VSPs and combinations thereof, as well as any commercially available biocides. The antimicrobial volatile or semi-volatile phytochemicals include essential oils or their active components such as agarwood oil, cajuput oil, cananga oil, cinnamon bark oil, citronella oil, clove oil, eucalyptus oil, fennel oil, ginger oil, kaffir lime oil, nutmeg oil, ollium xanthorrhiza oil, origanum oil, patchouli oil, rosemary oil, sandalwood oil, tea tree oil, thyme oil and vetiver oil.

Metal oxide sols, such as alumina sol, copper sol, silica sol, silver oxide sol, titania sol, zinc sol and zirconia sol, were prepared by hydrolyzing or peptizing water-soluble salt, metal alkoxide or commercial colloidal metal oxide in acidic or basic media. A typical embodiment is silica sol because it has good chemical stability and biocompatibility. For the preparation of silica sol from water-soluble salt, diluted inorganic acid was added dropwise into water-soluble silicate solution under vigorous stirring to obtain a silica sol with the appropriate pH value. A typical silica concentration is in the range of 0-0.6 mol/l. For the preparation of silica sol from silicon alkoxide, diluted inorganic acid was added into tetraethyl orthosilicate. The prepared emulsion was stirred above room temperature to obtain clear silica sol with weak acidity. For the preparation of silica sol from commercial colloidal silica, diluted inorganic acid was added drop by drop into commercial colloidal silica, such as Ludox™ products, under vigorous stirring. The ranges of sol concentration and pH value depend on initial colloidal silica.

Metal complexes, such as copper, silver, titanium and zinc complexes, were prepared by reacting metal salts or metal hydroxides with ligands in water or solvents. Metal salt solutions, such as silver nitrate, copper chloride, and zinc chloride, can be added to form the inorganic-organic shells.

The antimicrobial material is prepared by encapsulating biocides within an inorganic-organic shell. This is performed by mixing the biocide(s) with the pre-reacted inorganic-organic mixture of polymer and metal oxides, metal complexes, metal salts or metal particles at room temperature to create a stable emulsion stabilized by the inorganic-organic shells. The typical concentration range of the metal oxide or metal complex in the inorganic-organic shell and final antimicrobial material is 0.5-95 wt % and 0-5 wt %, respectively.

Various porous materials and porous media were used as substrates for coating with the present antimicrobial material. Porous materials include, but are not limited to, personal protective equipment (e.g., lab coats, facial masks, shoe covers and hair caps), household products (e.g., tissues, linens, napkins, curtains and tablecloths), clothes and infant products (e.g., diapers, wipes and toys). Porous media may include membranes and filters made up of different materials, such as polymers, ceramics and metals. Typical embodiments are commercial polyethylene membranes and HEPA filters. An antimicrobial coating according to the present subject matter was prepared by applying antimicrobial material on porous materials and porous media.

Optical microscopy images of biocide capsule emulsions were collected using an Olympus® BH2-MJLT microscope. Scanning electron microscope (SEM) images of biocide capsule emulsions, initial porous filters and porous filters with antimicrobial coatings were made using JEOL® JSM-6390 and JSM-6300F scanning electron microscopes equipped with energy dispersive X-ray detectors. FIG. 1 shows a schematic diagram of the encapsulation structure of the present antimicrobial material. The antimicrobial material is a stable sol suspension of biocide(s) encapsulated within inorganic-organic shell(s). The biocide(s) include at least one gaseous, volatile or semi-volatile component which can be released without requiring a water-bridge. The inorganic-organic shell includes a polymer network stabilized with inorganic metal oxides, metal complexes, metal salts or metal nanoparticles that, by themselves, may or may not exhibit biocidal activities.

The structure of the shell can vary depending on the interaction between the polymer and the inorganic components as shown in the "attachment" structure in FIG. 1. Uniform distribution of polymer and inorganic components within the shell results in the "hybrid" structure in FIG. 1, while a "layered or multi-layered" structure in FIG. 1 can result from diffusion limited interaction. This "multi-layered" shell can be formed at an oil/water interface depending on concentration, surface functional group, surface charge and solubility of metal compound, and hydrophilic/hydrophobic property and concentration of polymer. The present antimicrobial materials combine the advantages of the individual components: good antimicrobial activity and excellent surface adhesion property, which are important properties of a good coating.

As discussed above, the inorganic materials and the organic materials are each intermixed, with respect to one another, in structures of the inorganic-organic shells. As shown in FIG. 1, and as described above, the structures may be an attachment structure, a hybrid structure or a multi-layered structure. As shown in FIG. 1, the attachment structure is formed as an organic shell formed from the organic materials with the inorganic materials uniformly dispersed in the organic shell. The attachment structure is formed when the inorganic materials have a very low concentration. In this structure, the inorganic materials are formed as isolated units, such as nanoparticles (from several to dozens of nanometers in size), which are dispersed into the organic material shells.

As further seen in FIG. 1, the hybrid structure is formed as a network of the inorganic materials interpenetrating a network of the organic materials. The hybrid structure forms when the concentration of the inorganic materials is greater than in the attachment structure. As the concentration of the inorganic materials increases, the inorganic materials form continuous or semi-continuous morphologies, rather than the isolated units of the attachment structure. The inorganic network is formed from these morphologies. The organic materials also form a network, similar to the organic shell of the attachment structure. The two networks, however, do not form a multi-layer structure; i.e., the structure does not exhibit layer-layer contact. In the hybrid structure, the inorganic material network and the organic material network are mixed/interpenetrated to form inorganic-organic shells. The inorganic materials may penetrate into the organic network in the radial direction, for example (as shown in FIG. 1), or in a random direction, as another example.

Figure 23A:
FIG. 23A shows an optical microscope image of multi-layered encapsulated chlorine dioxide.

In contrast, the multi-layered structure is formed from at least one layer of the organic materials sandwiched between adjacent layers of the inorganic materials, as shown in FIG. 1. The multi-layer structure can result from diffusion limited interaction. The multi-layer shells, with at least one layer of the organic materials sandwiched between adjacent layers of the inorganic materials, can be formed at an oil/water interface, depending on concentration, the surface functional group(s) and surface charge of the inorganic materials, and the hydrophilic/hydrophobic properties and critical micelle concentration of the organic materials. In the multi-layer structure, the inorganic material layers are made up of agglomerated inorganic nanoparticles with a size of below 10 nanometers, with the final layer thickness in the range of 10 nanometers to 100 nanometers. The total number of inorganic layers and organic interlayers is typically below 10 when using the one-pot synthesis method. A layer-by-layer synthesis strategy, involving the alternative addition of inorganic materials and organic materials, can form thicker multi-layer shells up to 500 nanometers, with each inorganic and organic layer alternating. FIG. 23A shows an optical microscope image of multi-layered encapsulated chlorine dioxide.

Figure 23B:
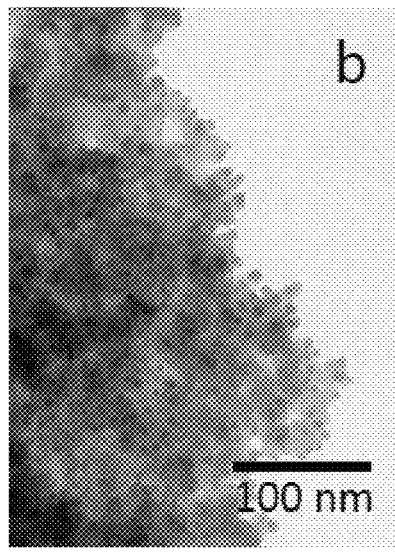
FIG. 23B is an SEM image of a porous silica shell made of nanoscopic $SiO_2$.
Figure 23C:
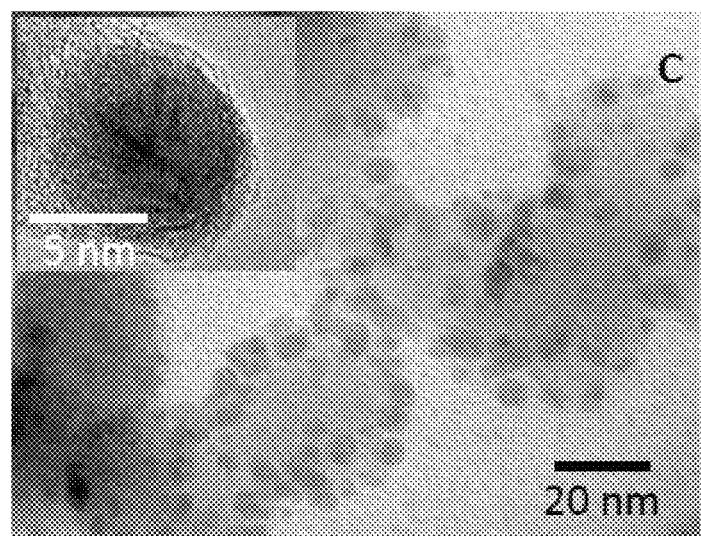
FIG. 23C is a high magnification transmission electron microscope image of the silica shell of FIG. 23B, showing a network of silica nanoparticles forming a porous structure The $SiO_2$ is decorated with nano-copper particles.

FIG. 23B is an SEM image of a porous silica shell made of nanoscopic $SiO_2$. FIG. 23C is a high magnification transmission electron microscope image of the silica shell of FIG. 23B, showing a network of silica nanoparticles forming a porous structure The $SiO_2$ is decorated with nano-copper particles. FIG. 24A is a plot of the room temperature release profile of chlorine dioxide without a silica layer $$\left(\frac{m_{SiO_2}}{m_{SiO_{2,0}}}\right) = 0, 1 \ SiO_2 \ layer \left(100 \ nm, \left(\frac{m_{SiO_2}}{m_{SiO_{2,0}}}\right) = 1\right),$$

$$and \ 2 \ SiO_2 \ layers \left(210 \ nm, \left(\frac{m_{SiO_2}}{m_{SiO_{2,0}}}\right) = 1.5\right).$$

FIG. 24B is a plot of the room temperature release rate of chlorine dioxide and the half-life estimated by accelerated aging for 0, 1 and 2 $SiO_2$ encapsulating layers. FIG. 24C is a plot of the percent stored chlorine dioxide released after 7 days of accelerated aging at 50° C. and the corresponding bactericidal properties against *S. aureus* for 10 minutes of contact time.

FIGS. 2A through 2F illustrate different silica materials and their structural representations. FIGS. 2A and 2B depict a silica sol prepared from water soluble silica, while FIGS. 2C and 2D show a silica sol prepared from silicon alkoxide. FIGS. 2E and 2F represent a silica sol prepared from colloidal silica. The different silica materials and their preparations are provided in the following Examples.

Through the judicious selection of biocides, inorganic and organic components, along with the appropriate coating procedure, the use of the antimicrobial material does not change function-related physical properties of porous media or porous materials, such as filtration performance, color and macroscopic morphology. FIG. 3 presents different inorganic materials for making inorganic-organic shells of biocide capsules of metal oxide (i.e., boehmite alumina sol and titania sol) and metal complex (i.e., titanium peroxo) sols. A stable mixed suspension of polymer and metal oxide/complex sol without any precipitations can be prepared for further making inorganic-organic shells by mixing polymer solution and metal oxide/complex sol at appropriate concentrations and pH values.

Figure 4:
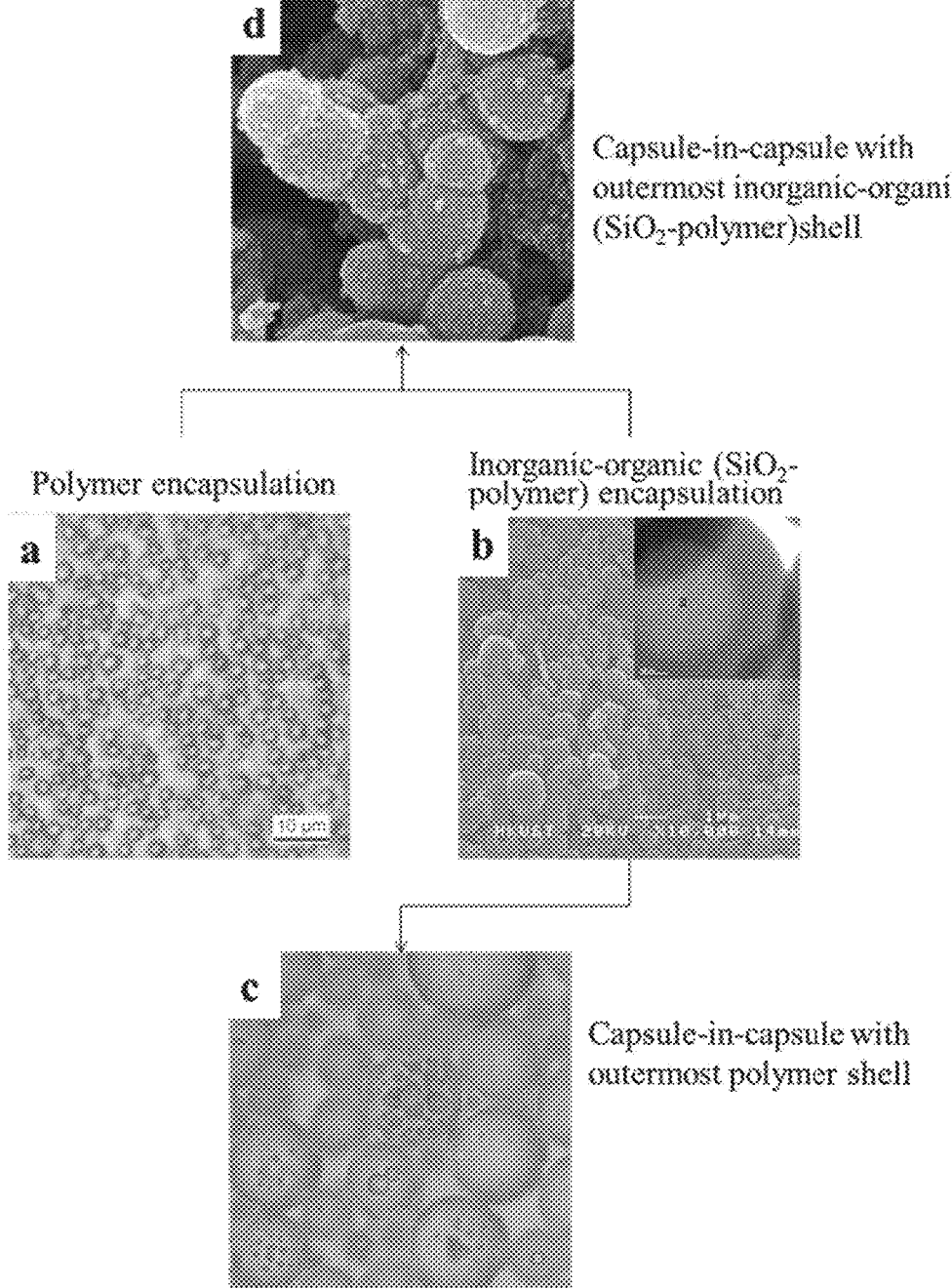
FIG. 4 shows an optical microscope image of thyme oil encapsulated within a polyvinyl alcohol (PVA)-polyethylenimine (PEI) polymer capsule combined with a scanning electron microscope (SEM) image of chlorine dioxide contained within $SiO_2$—$HO(CH_2CH_2O)_{20}(CH_2CH(CH_3)O)_{70}$ $(CH_2CH_2O)_{20}H$ block copolymer capsules to produce a capsule-in-capsule material where the latter capsules are encapsulated within the former capsules and, alternatively, where the chlorine dioxide contained within a $SiO_2$—$HO$ $(CH_2CH_2O)_{20}(CH_2CH(CH_3)O)_{70}(CH_2CH_2O)_{20}H$ block copolymer capsule is encapsulated within another $SiO_2$—$HO(CH_2CH_2O)_2O(CH_2CH(CH_3)O)_7O(CH_2CH_2O)_{20}H$ shell.
Figure 5:
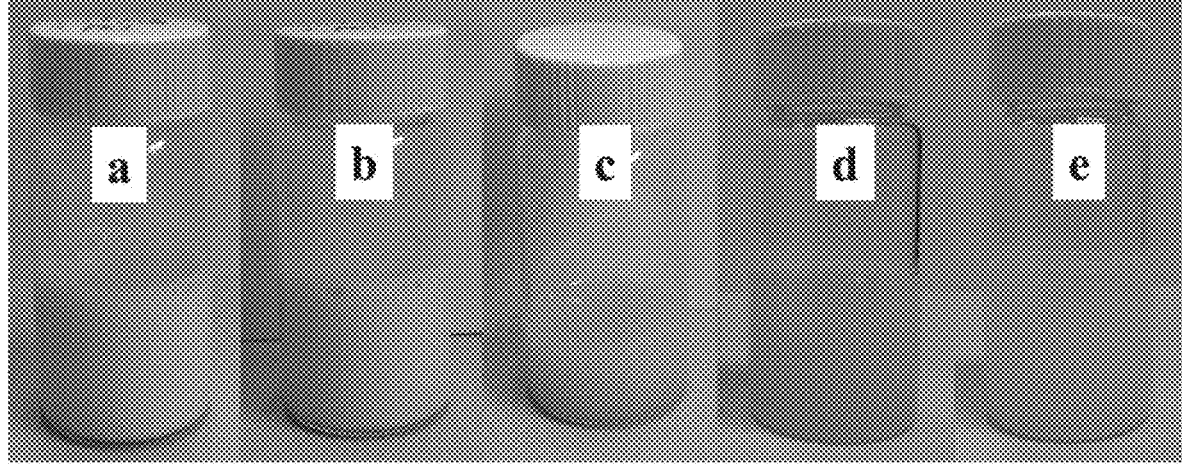
FIG. 5 shows the prepared formulations of the antimicrobial materials based on (a) thyme oil encapsulated within PVA-PEI shell and its corresponding (b) capsule-in-capsule form with inorganic-organic $SiO_2$—$HO(CH_2CH_2O)_{106}$ $(CH_2CH(CH_3)O)_{70}(CH_2CH_2O)_{106}H$ shell; (c) chlorine dioxide solution encapsulated within inorganic-organic $SiO_2$—$HO(CH_2CH_2O)_{20}(CH_2CH(CH_3)O)_{70}(CH_2CH_2O)_2$ OH shell and its corresponding capsule-in-capsule forms with (d) outer shells of $HO(CH_2CH_2O)_{106}(CH_2CH(CH_3)O)$ $_{70}(CH_2CH_2O)_{106}H$ block copolymer and (e) inorganic-organic $SiO_2$—$HO(CH_2CH_2O)_{20}(CH_2CH(CH_3)O)_{70}$ $(CH_2CH_2O)_{20}H$ polymer.

FIG. 4 and FIG. 5 show the optical microscopy and scanning electron microscopy images of biocide capsules enclosed within organic and inorganic-organic shells and their photos, respectively. FIG. 4 clearly shows the structures of the biocide capsule (single shell) and capsule-in-capsule (multi-shell). As shown in FIG. 5, biocide capsules may be prepared as stable semi-transparent sol suspensions of different colors, depending on concentration and type of biocide, shell material and pH value.

Figure 6A:
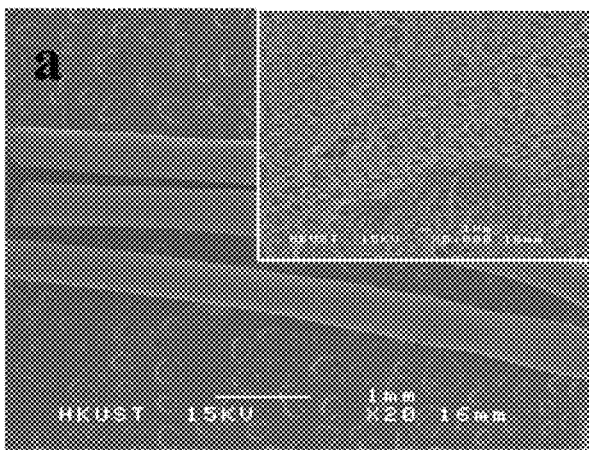
FIG. 6A is an SEM image of porous filtration media made from polysulfate hollow-fiber.
Figure 6B:
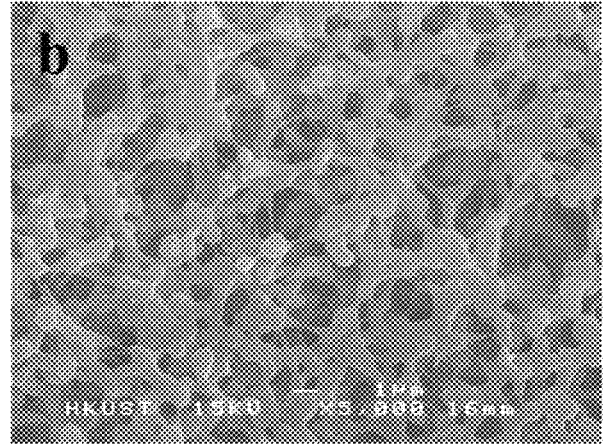
FIG. 6B is an SEM image of porous filtration media made from polyvinylidene fluoride.
Figure 6C:
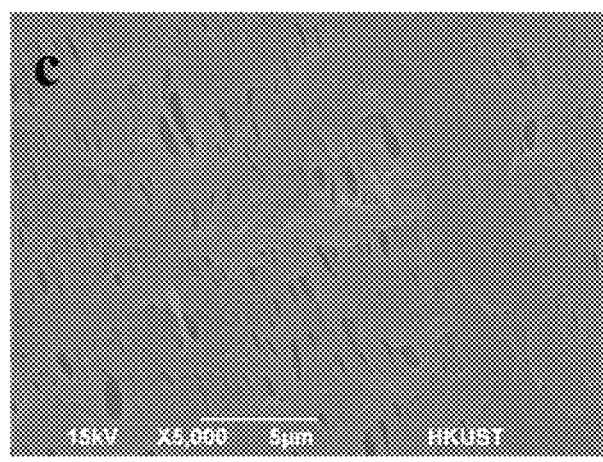
FIG. 6C is an SEM image of porous filtration media made from polyethylene.
Figure 6D:
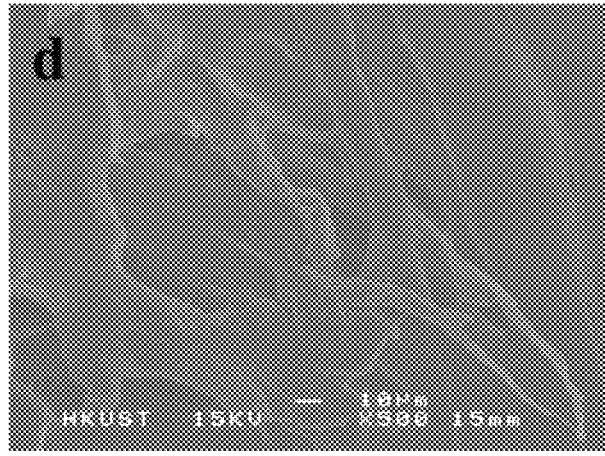
FIG. 6D is an SEM image of porous filtration media made from cellulose triacetate.
Figure 6E:
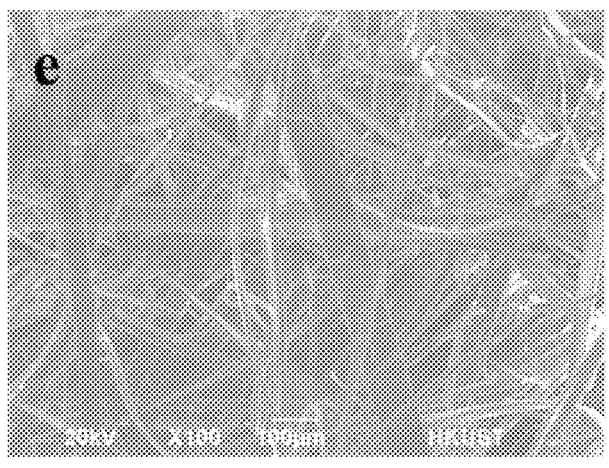
FIG. 6E is an SEM image of porous filtration media made from Filtrete® 1200, manufactured by the 3M® Company.
Figure 6F:
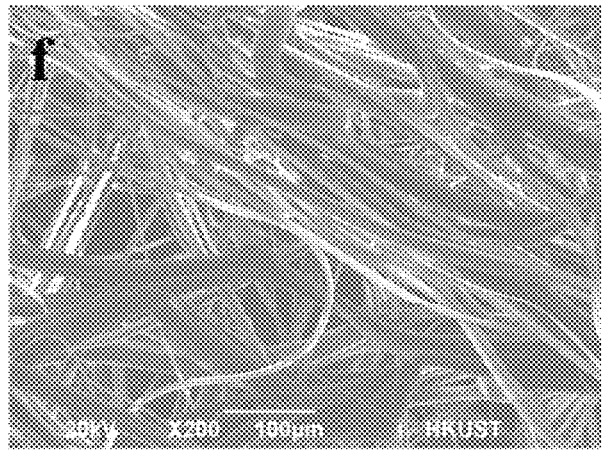
FIG. 6F is an SEM image of porous filtration media made from Filtrete® 1900, manufactured by the 3M® Company.

FIGS. 6A-6F show SEM images of common porous filtration media made up of different polymer materials, and exhibiting different porous structures and morphologies. Polysulfate, polyvinylidene fluoride, polyethylene and cellulose triacetate membranes (FIGS. 6A through 6D) are widely applied in the fields of water filtration and water purification. FIGS. 6E and 6F are SEM images of two commercial air filters manufactured by the 3M® company. They are made up of electrostatically charged fibers and verified to be effective for removing large airborne allergens. The antimicrobial material may be applied on these common porous filtration media to impart bactericidal and sporicidal activities, as illustrated in FIGS. 10A-10D, 11, 12A-12C, 14A-14G, 20A-20C, 21A-21B, and 22A-22C and Table 1.

Figure 7:
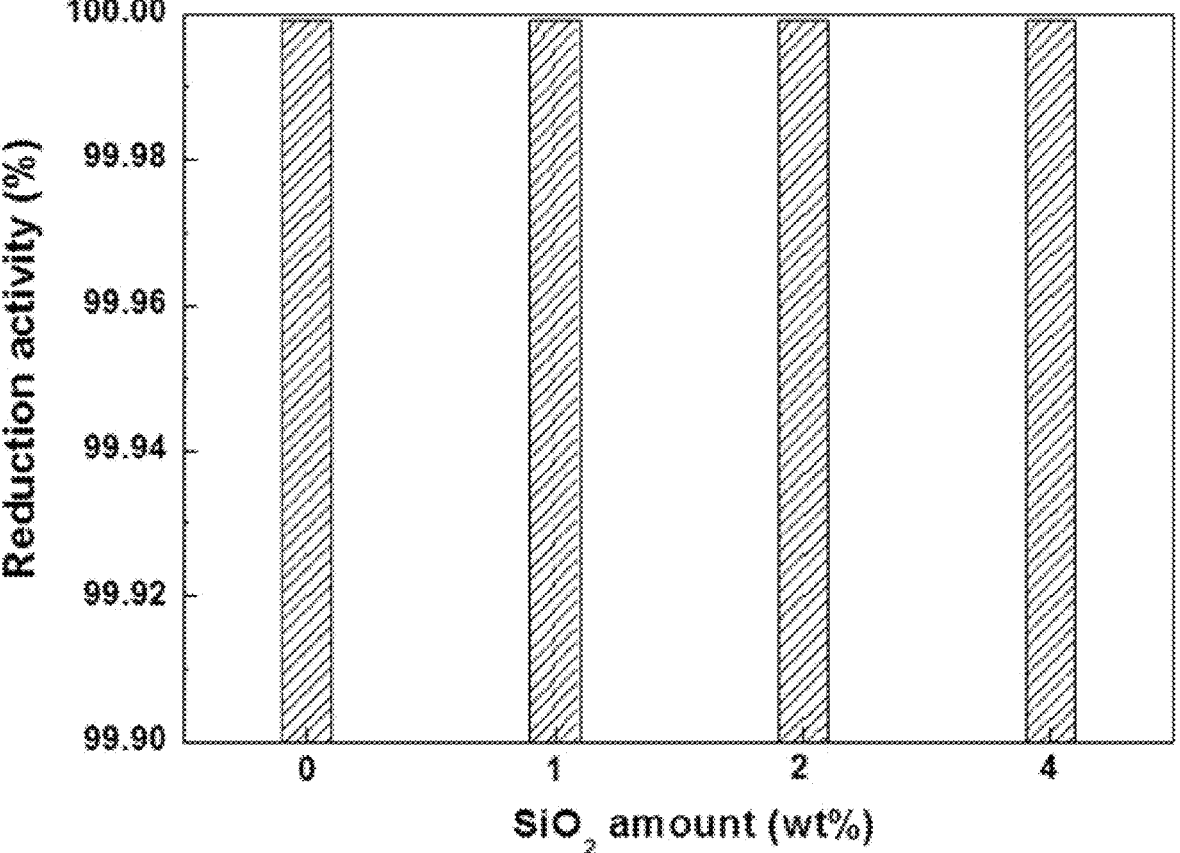
FIG. 7 presents the bactericidal activities against $10^6$ CFU/ml heterotrophic bacteria of capsule-in-capsule antimicrobial coatings comprising polymer-encapsulated $ClO_2$ capsules enclosed within outermost $SiO_2$-polymer shells and polymer shell.

FIG. 7 presents antimicrobial activities of the coatings prepared as capsule-in-capsule structures with and outermost inorganic-organic shell (i.e., 1 wt % $SiO_2$, 2 wt % $SiO_2$ and 4 wt % $SiO_2$) and a capsule-in-capsule structure with an outermost organic shell (i.e., 0 wt % $SiO_2$). Antimicrobial coatings prepared by selecting silica sol as the inorganic material via a similar method to that of Example 27 below exhibit 99.999% reduction activities against $10^6$ CFU/ml bacteria, even when the silica amount was increased to 4 wt %.

Figures 8A, 8B, 8C:
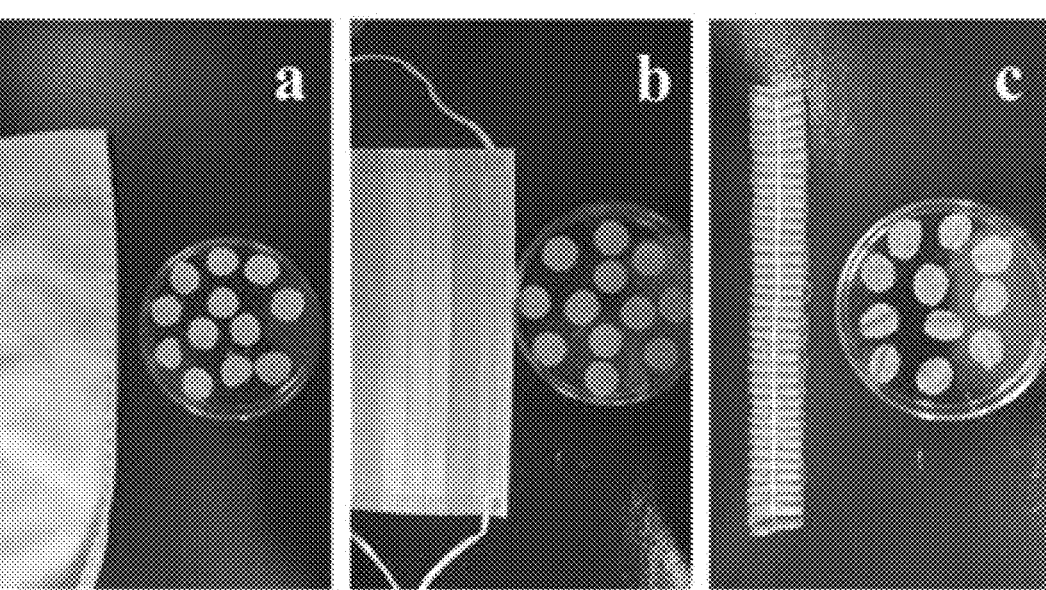
FIG. 8A shows laboratory gown material made of cotton and polyester fibers, both in its original form and coated with capsule-in-capsule antimicrobial coatings.
FIG. 8B shows surgical disposable face mask material made of spun bonded and melt blown nonwoven fibers, both in its original form and coated with capsule-in-capsule antimicrobial coatings.
FIG. 8C shows bouffant cap material made of polypropylene, both in its original form and coated with capsule-in-capsule antimicrobial coatings.
Figures 8D, 8E, 8F, 8G:
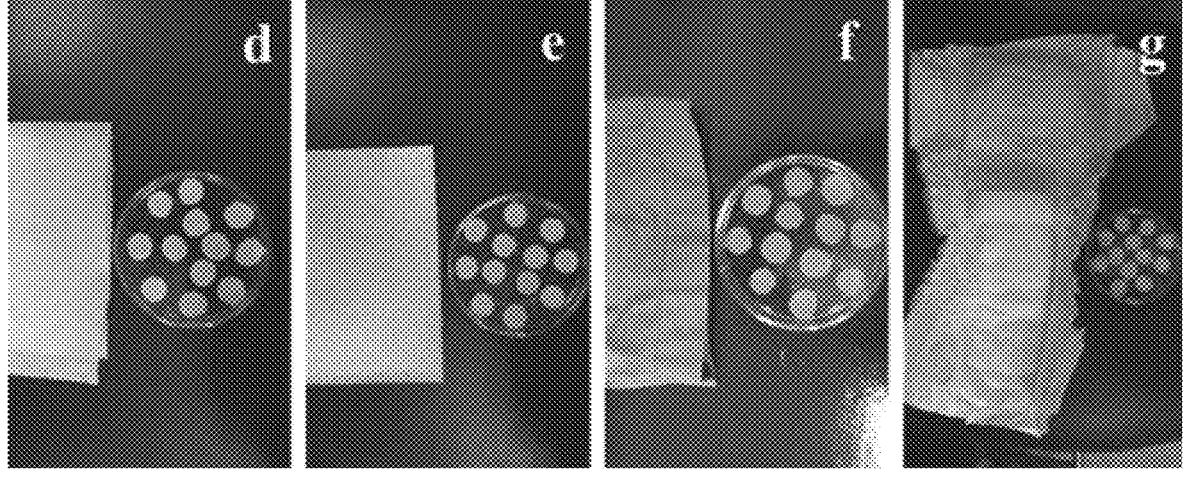
FIG. 8D shows cellulose wipe material, both in its original form and coated with capsule-in-capsule antimicrobial coatings.
FIG. 8E shows polypropylene wipe material, both in its original form and coated with capsule-in-capsule antimicrobial coatings.
FIG. 8F shows medical gown material made of cotton and polyester, both in its original form and coated with capsule-in-capsule antimicrobial coatings.
FIG. 8G shows diaper liner material, both in its original form and coated with capsule-in-capsule antimicrobial coatings.
Figure 9A:
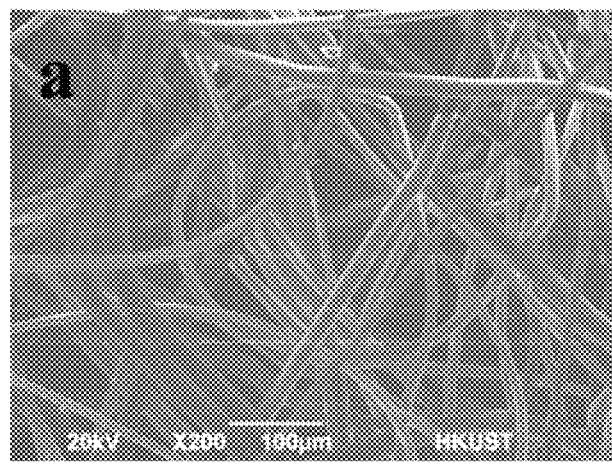
FIG. 9A is an SEM image of an uncoated polymer HVAC filter.
Figure 9B:
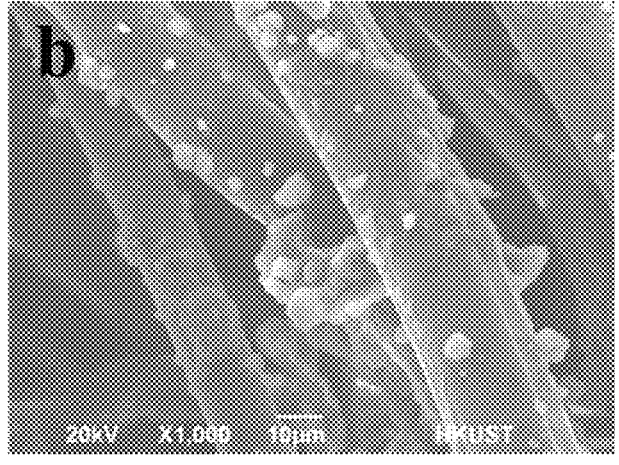
FIG. 9B is an SEM image of a polymer HVAC filter coated with polymer-encapsulated $ClO_2$ capsules enclosed within outermost $SiO_2$-polymer shells.
Figure 9C:
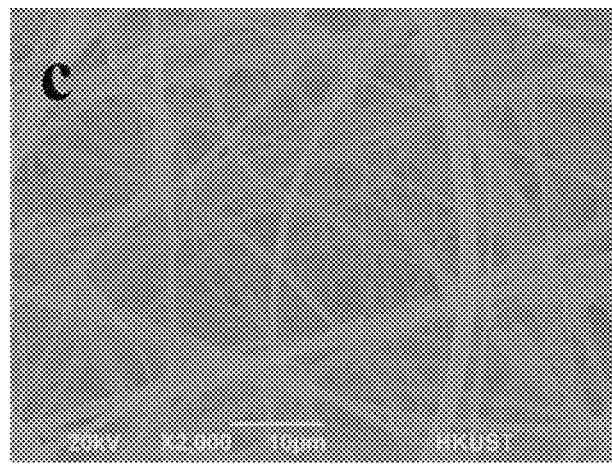
FIG. 9C is an SEM image of an uncoated glass HEPA filter.
Figure 9D:
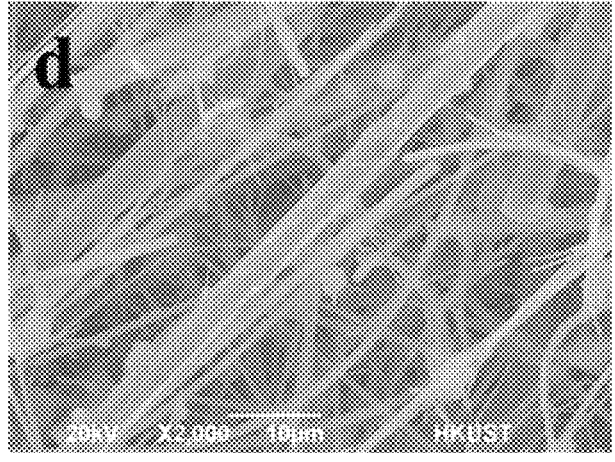
FIG. 9D is an SEM image of a glass HEPA filter coated with polymer-encapsulated $ClO_2$ capsules enclosed within outermost $SiO_2$-polymer shells.
Figure 9E:
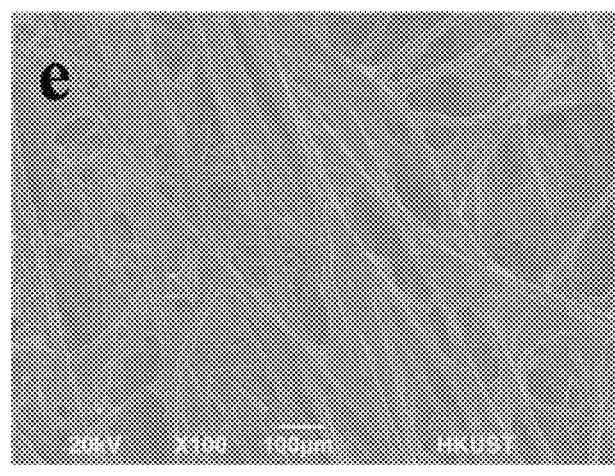
FIG. 9E is an SEM image of an uncoated polymer HEPA filter.
Figure 9F:
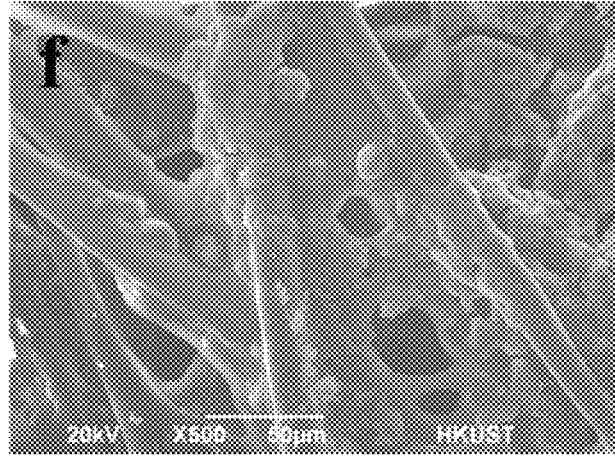
FIG. 9F is an SEM image of a polymer HEPA filter coated with polymer-encapsulated $ClO_2$ capsules enclosed within outermost $SiO_2$-polymer shells.
Figure 10A:
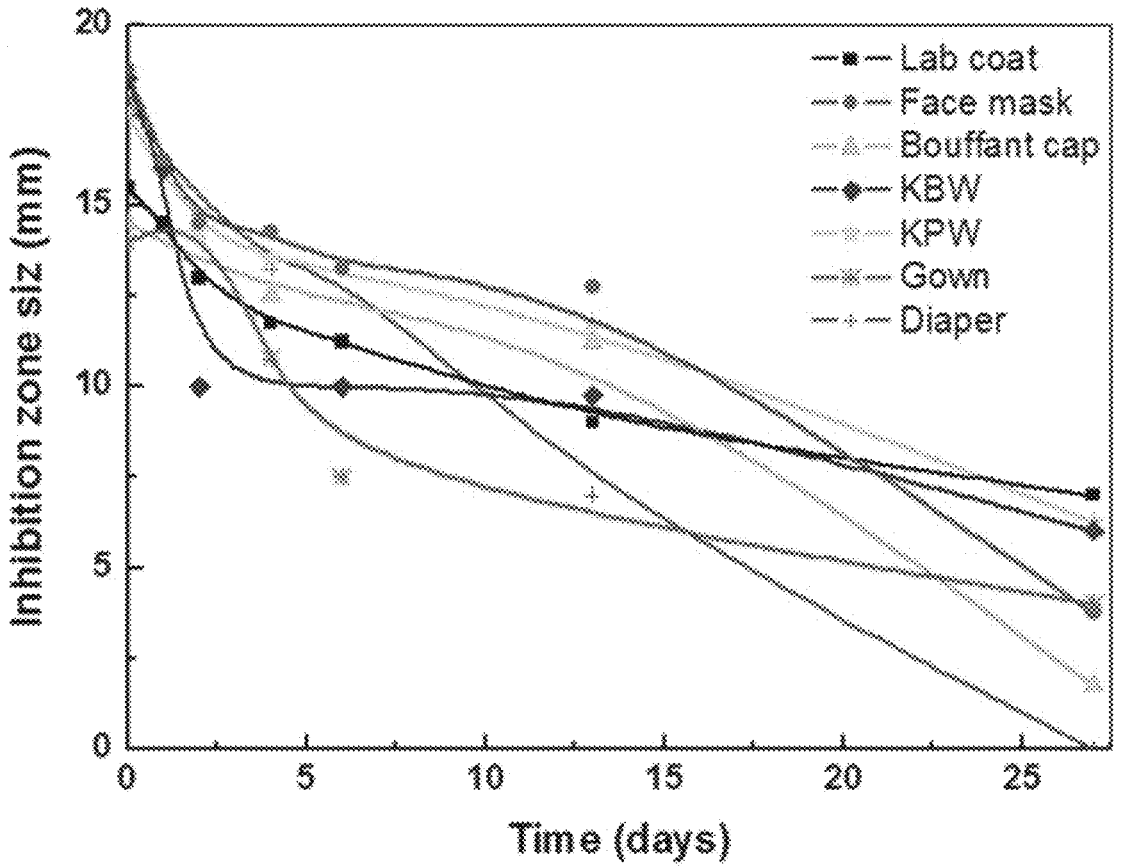
FIG. 10A is a graph showing the sizes of the inhibition zones of different porous materials with capsule-in-capsule antimicrobial coatings over 28 days for $10^4$ CFU/ml *Cladosporium* spores.
Figure 10B:
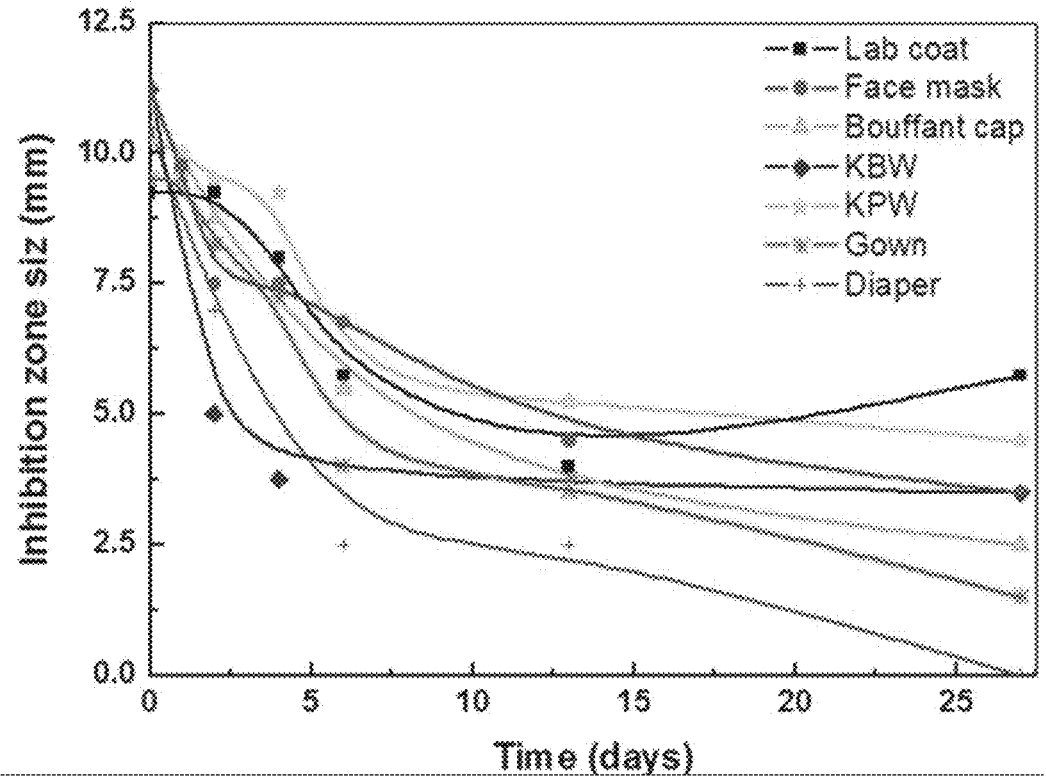
FIG. 10B is a graph showing the sizes of the inhibition zones of different porous materials with capsule-in-capsule antimicrobial coatings over 28 days for $10^5$ CFU/ml *E. coli*.
Figure 10C:
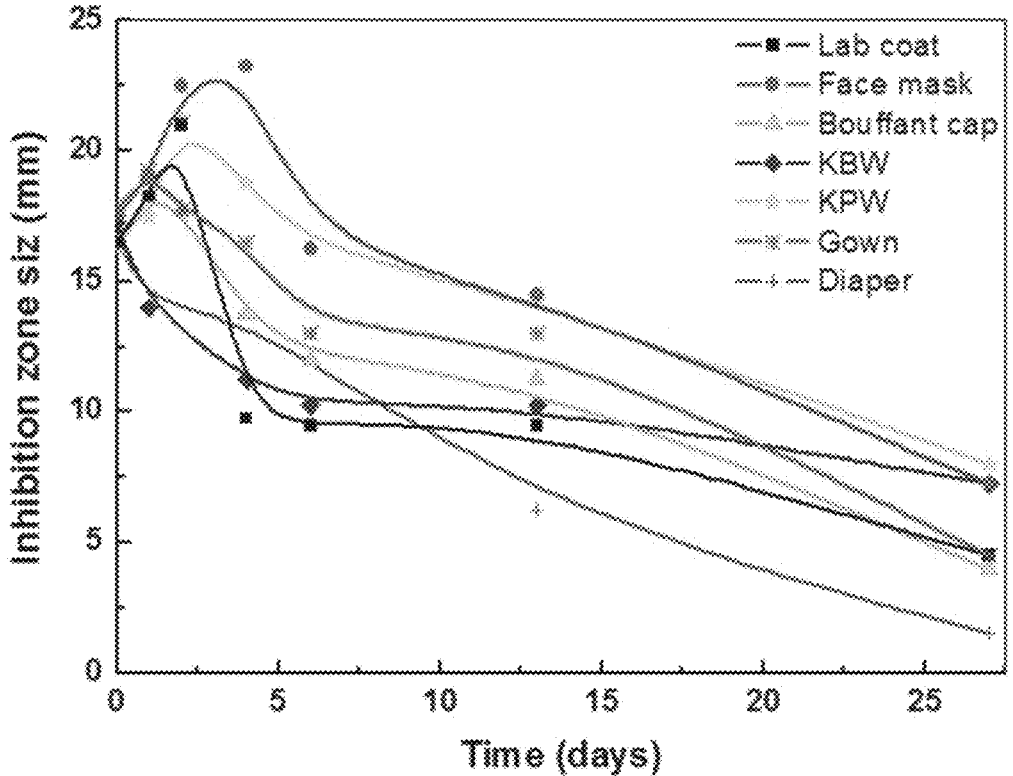
FIG. 10C is a graph showing the sizes of the inhibition zones of different porous materials with capsule-in-capsule antimicrobial coatings over 28 days for $10^5$ CFU/ml MRSA.
Figure 10D:
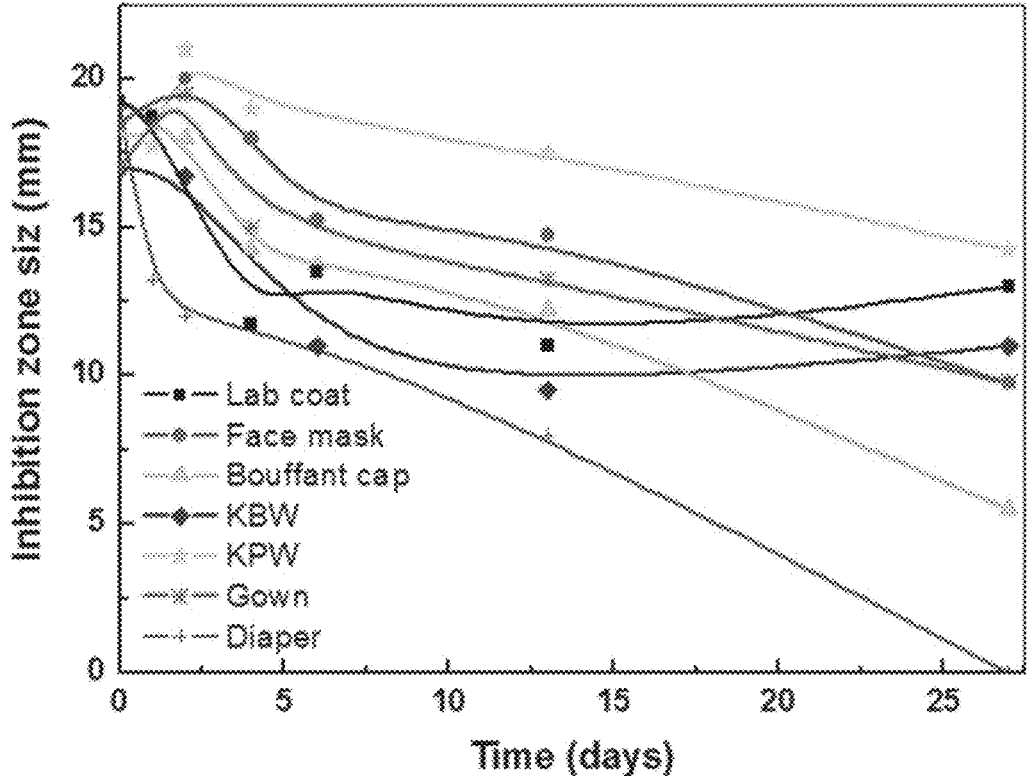
FIG. 10D is a graph showing the sizes of the inhibition zones of different porous materials with capsule-in-capsule antimicrobial coatings over 28 days for $10^5$ CFU/ml *S. aureus*.

FIGS. 8A through 8G show common porous materials, including personal protective equipment (FIGS. 8A-8G), household products (FIGS. 8D and 8E), clothes (FIG. 8F) and infant products (FIG. 8G). After coating with the antimicrobial material, obvious changes, such as fading, shrinking, cracking and dissolving, do not appear, which indicates that the antimicrobial material has a good compatibility with these porous materials.

FIGS. 9A-9F show SEM images of a macroporous filter and two HEPA filters at different stages, i.e., initially and after coating with a biocide capsule emulsion. Though the three filters have different porosities and morphologies, all filters coated with the biocide capsule emulsion show the presence of small capsules attached on the smooth surfaces of the fibers. There is no apparent blockage of the flow channels and the gas flow remains the same after coating. These results indicate that the antimicrobial material is compatible for the use in porous filtration media.

FIGS. 10A-10D show the sizes of the inhibition zone for $10^4$ CFU/ml mold (*Cladosporium*) and $10^5$ CFU/ml bacteria (*E. coli*, MRSA and *S. aureus*) of porous materials coated with the antimicrobial material. Generally, freshly prepared samples have better inhibition capacities for mold and bacteria. The inhibition zone sizes of most samples decreased after four weeks, as is to be expected with the sustained release of the biocide. The uncoated porous materials did not have any inhibition zones for mold and bacteria.

Figure 11:
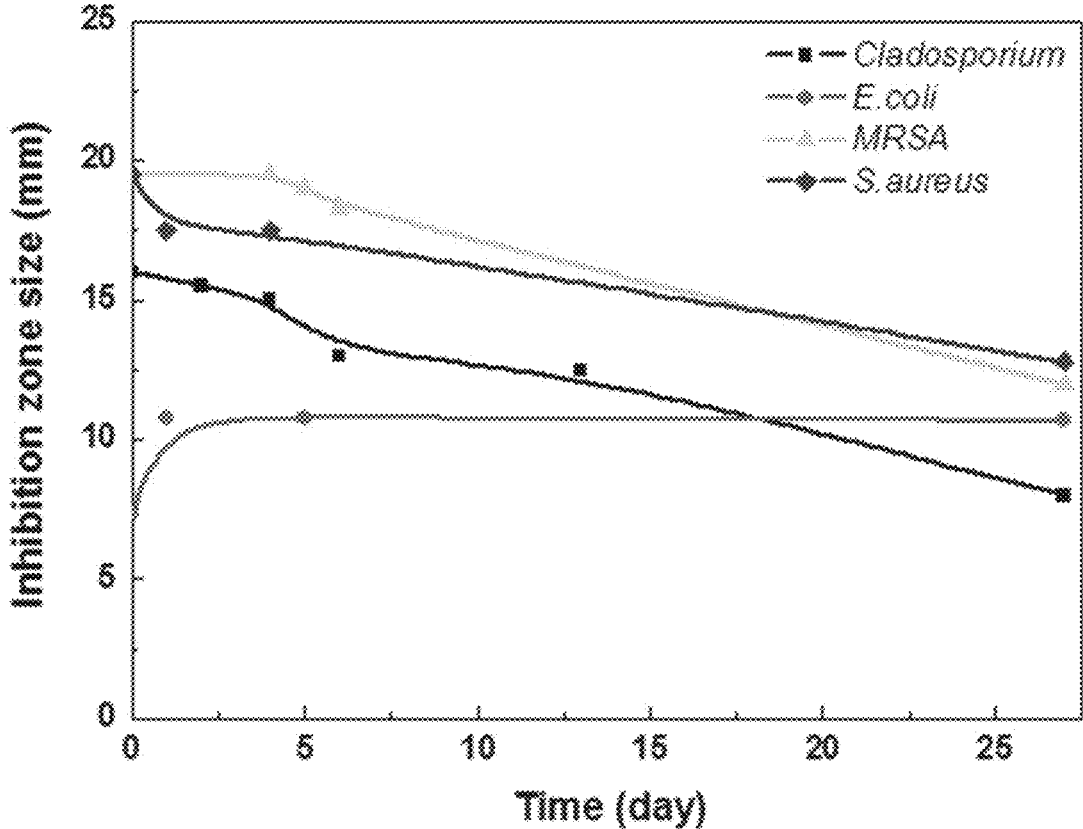
FIG. 11 is a graph showing the sizes of the inhibition zones of coated HEPA filter over 28 days for $10^4$ CFU/ml *Cladosporium* spores and $10^5$ CFU/ml *E. coli*, MRSA and *S. aureus*.

FIG. 11 presents the sizes of the inhibition zone for $10^4$ CFU/ml mold (*Cladosporium*) and $10^5$ CFU/ml bacteria (*E. coli*, MRSA and *S. aureus*) of HEPA filters coated with the antimicrobial material. The coated HEPA filter exhibits long-term antimicrobial activity against mold and bacteria. Inhibition zone sizes for *Cladosporium*, *E. coli*, MRSA and *S. aureus* of the samples stored at room temperature for 27 days are, respectively, 50%, 147%, 62% and 66% of those of the day 0 samples.

Figure 12A:
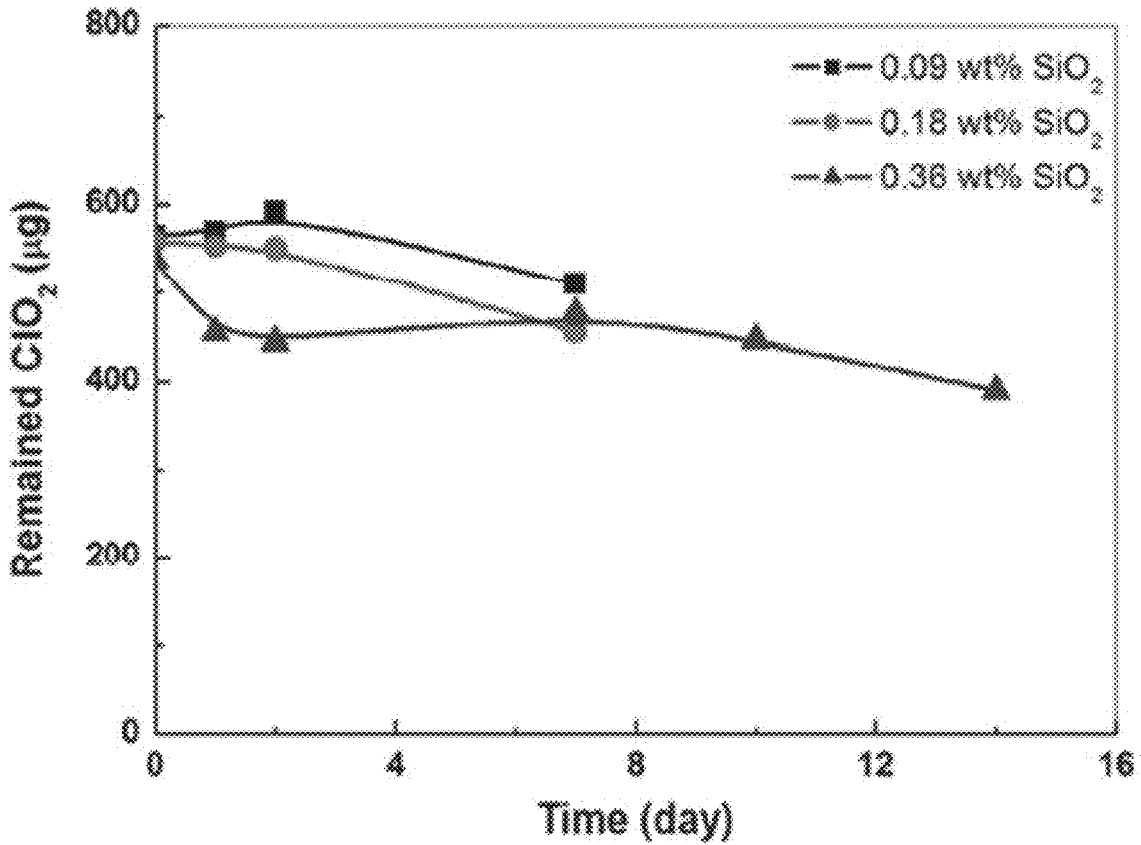
FIG. 12A is a plot of residual $ClO_2$ in coated ($ClO_2$ capsules enclosed within outermost $SiO_2$-polymer shell) HVAC filters at room temperature for an accelerated life test.
Figure 12B:
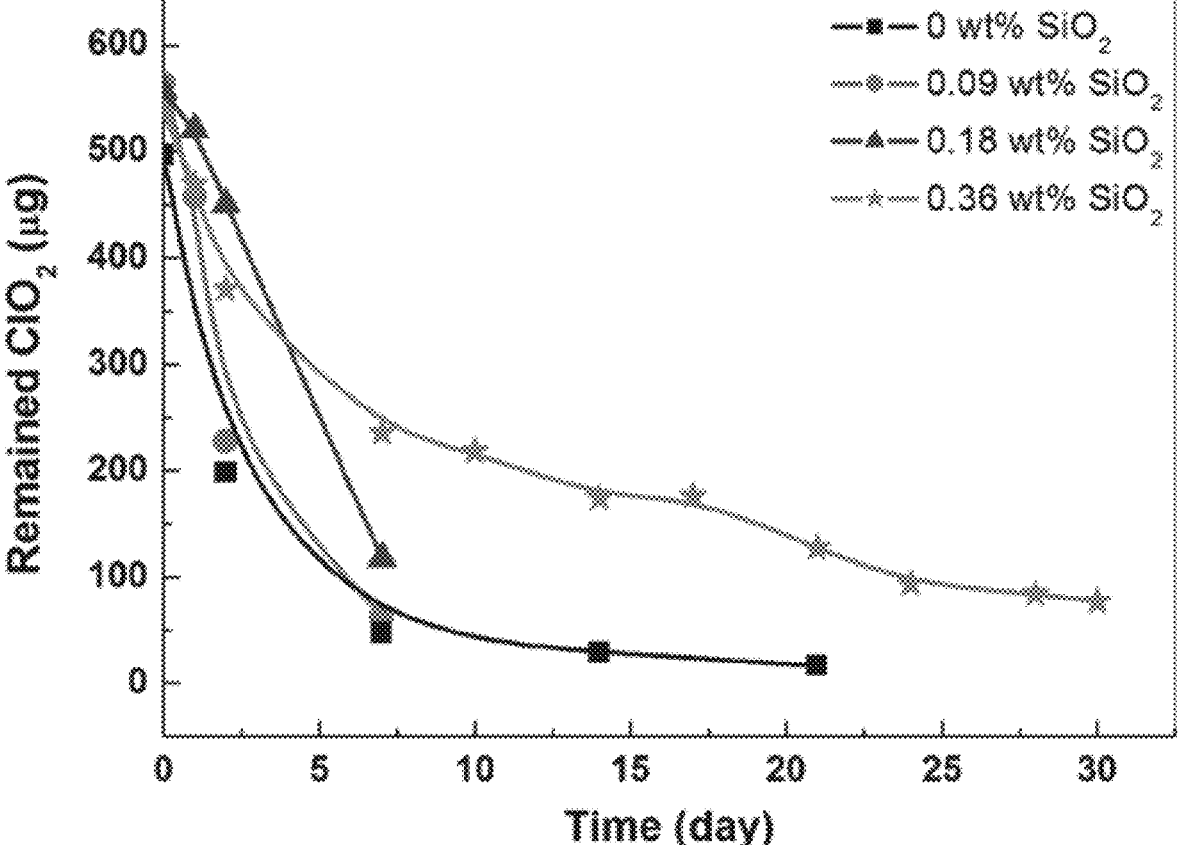
FIG. 12B is a plot of residual $ClO_2$ in coated ($ClO_2$ capsules enclosed within outermost $SiO_2$-polymer shell) HVAC filters at 50° C. for an accelerated life test.
Figure 12C:
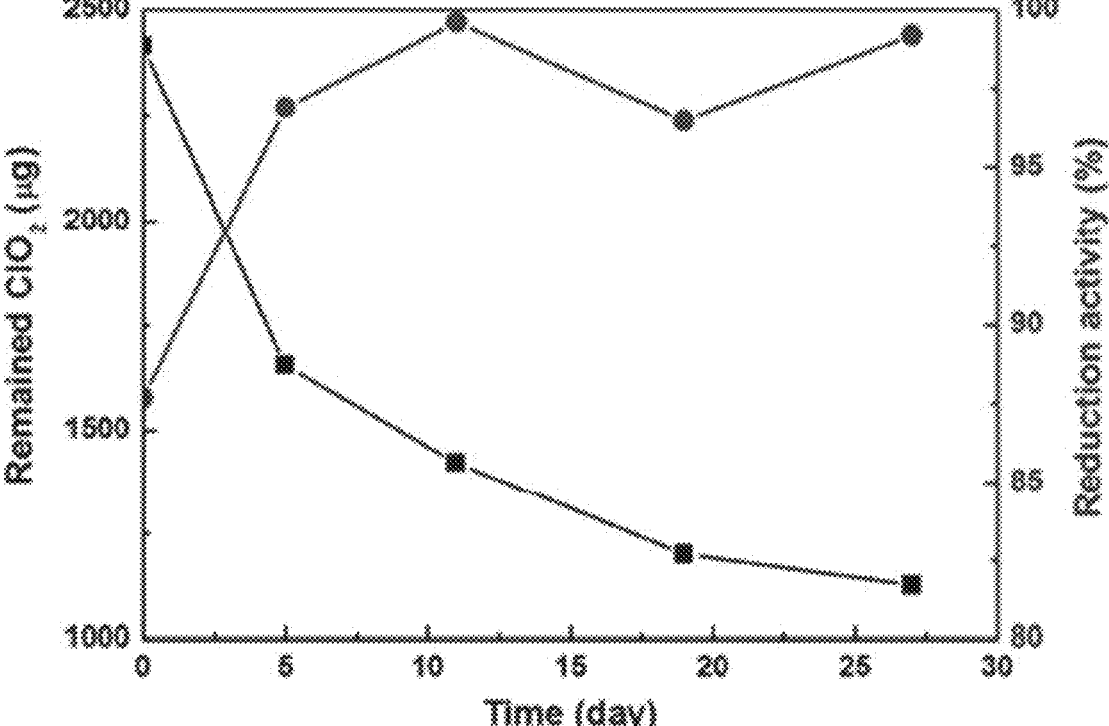
FIG. 12C is a plot showing the bactericidal activities against $10^5$ CFU/ml *S. aureus* during the accelerated life test of FIGS. 12A and 12B.
Figure 13:
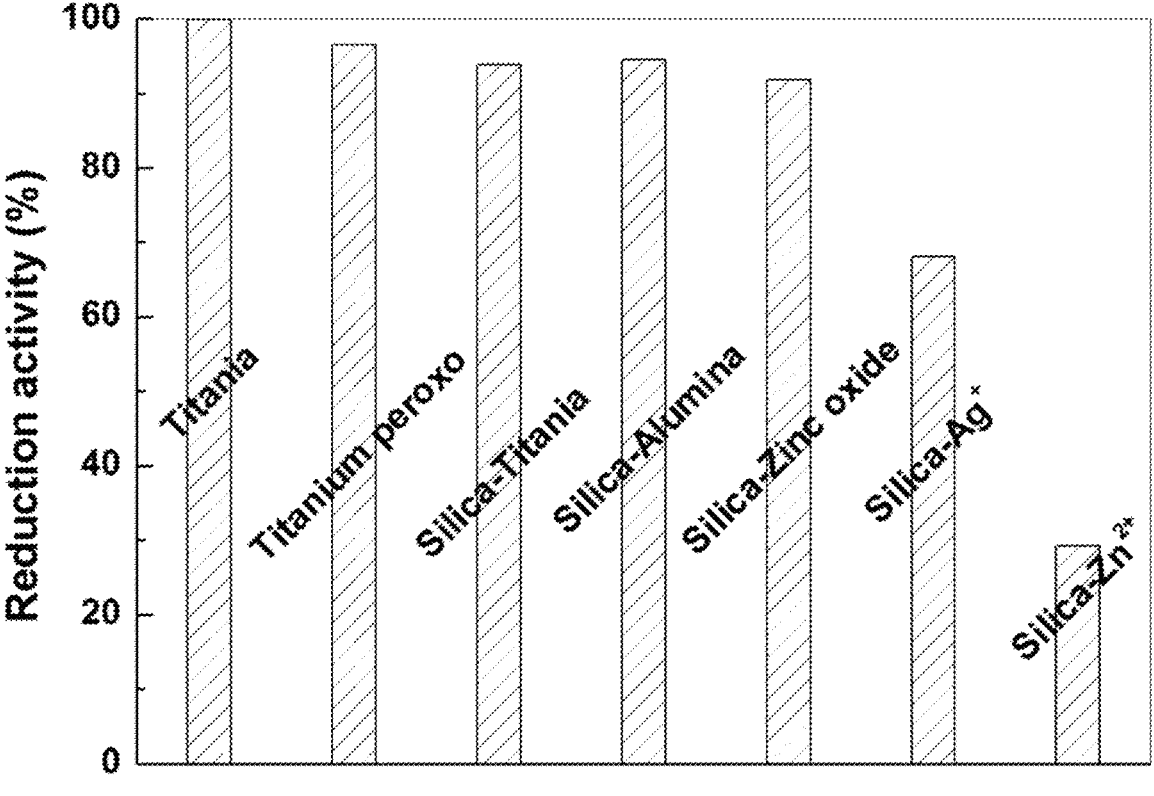
FIG. 13 represents bactericidal activities against $10^5$ CFU/ml *S. aureus* of the coatings prepared from polymer-encapsulated $ClO_2$ capsules enclosed within outermost metal oxide-polymer shell, metal complex-polymer shell, mixed metal oxide-polymer shells and metal oxide-metal ion-polymer shells.

FIGS. 12A and 12B show the time-dependent curves of $ClO_2$ amount on HVAC filters coated with the antimicrobial materials formed from polymer-encapsulated $ClO_2$ capsules enclosed within outermost $SiO_2$-polymer shells and polymer shell at room temperature and at 50° C. For the samples stored at room temperature, the $ClO_2$ amount remains unchanged. At 50° C., the release of $ClO_2$ depends on the amount of inorganic $SiO_2$ in the outermost inorganic-organic shell. Most of the $ClO_2$ was released within 7 days for the antimicrobial material containing less than 0.2 wt % $SiO_2$, while the sample with 0.36 wt % silica retains 44% and 14% of the original $ClO_2$ after the $7^{th}$ and $30^{th}$ day, respectively. As shown in FIG. 12C, the preferred sample exhibits much higher $ClO_2$ loading and improved stability. After 27 days at 50° C., the preferred sample still gives a reduction activity of 99.2% for $10^5$ CFU/ml *S. aureus*, and retains 47% $ClO_2$ compared to the freshly prepared sample. These results indicate that the addition of silica sol into a polymer shell improves the long-term releasing of the biocides from the antimicrobial coating. FIG. 13 presents the effect of the inorganic component in the outermost inorganic-organic shell on the antimicrobial activity of double encapsulated chlorine dioxide.

Figure 14A:
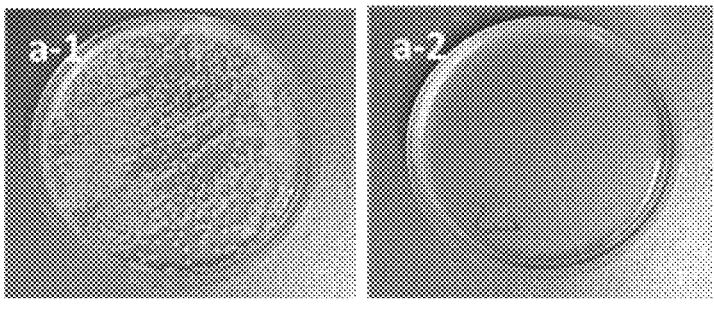
FIG. 14A shows a side-by-side comparison of release bactericidal tests for *S. aureus* on 1) uncoated HEPA filters and 2) HEPA filters coated with polymer-encapsulated $ClO_2$ capsules enclosed within outermost $SiO_2$-polymer shells.
Figure 14B:
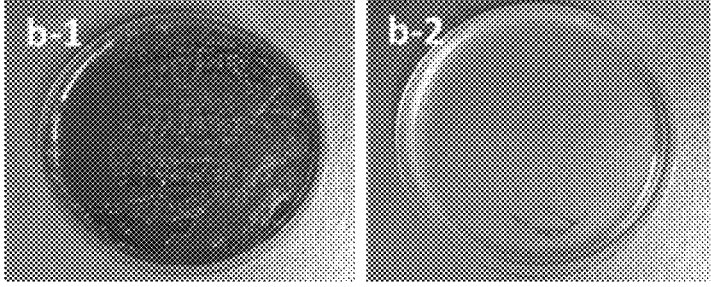
FIG. 14B shows a side-by-side comparison of release bactericidal tests for *Pseudomonas* on 1) uncoated HEPA filters and 2) HEPA filters coated with polymer-encapsulated $ClO_2$ capsules enclosed within outermost $SiO_2$-polymer shells.
Figures 14C, 14D, 14E:
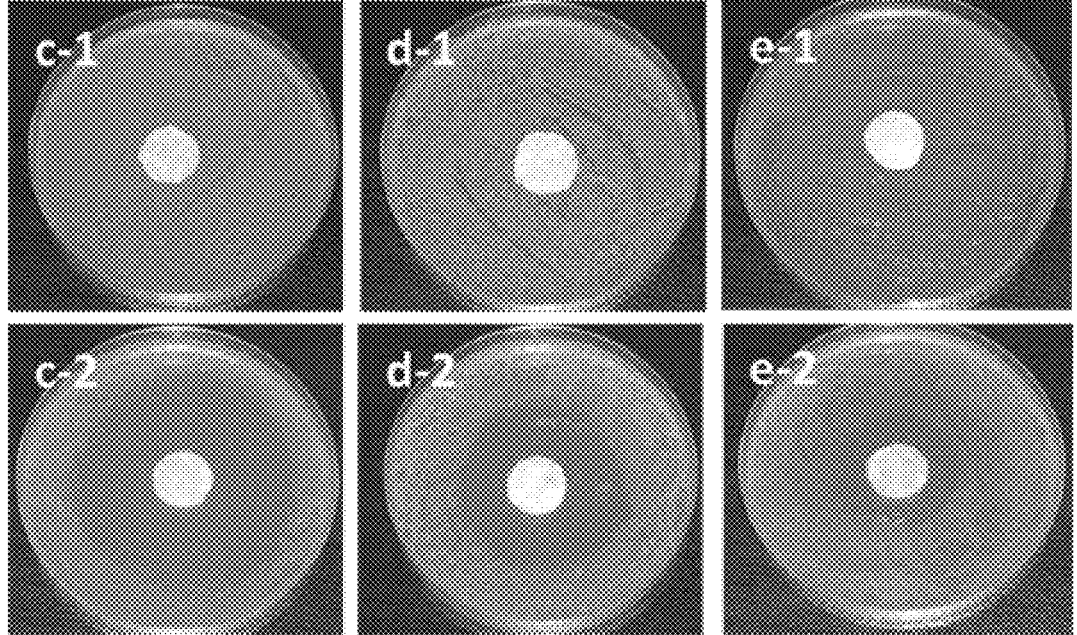
FIG. 14C shows a side-by-side comparison of inhibition zone tests for *E. coli* on 1) uncoated HEPA filters and 2) HEPA filters coated with polymer-encapsulated $ClO_2$ capsules enclosed within outermost $SiO_2$-polymer shells.
FIG. 14D shows a side-by-side comparison of inhibition zone tests for *S. aureus* on 1) uncoated HEPA filters and 2) HEPA filters coated with polymer-encapsulated $ClO_2$ capsules enclosed within outermost $SiO_2$-polymer shells.
FIG. 14E shows a side-by-side comparison of inhibition zone tests for *Pseudomonas* on 1) uncoated HEPA filters and 2) HEPA filters coated with polymer-encapsulated $ClO_2$ capsules enclosed within outermost $SiO_2$-polymer shells.

FIGS. 14A through 14G present the results of release antimicrobial tests and inhibition zone tests of uncoated HEPA filters and HEPA filters coated with polymer-encapsulated $ClO_2$ capsules enclosed within outmost $SiO_2$-polymer shells for different bacteria and mold, including *S. aureus, Pseudomonas, E. coli, B. subtilis* and (*Cladosporium* spores, respectively. Uncoated HEPA filters neither have any release antimicrobial activities nor appear to have any inhibition zones for different bacteria and mold. FIGS. 14A (second image on the right) and 14B (second image on the right) show that no bacterium colonies grow on agar plates, which indicates coated HEPA filters have good release-killing activities. The sizes of the inhibition zones shown in FIGS. 14C (second image on the right), 14D (second image on the right), 14E (second image on the right), 14F (second image on the right) and 14G (second image on the right) are in the range of 14 mm (for *Pseudomonas*) to 29 mm (for *E. coli*).

Figure 15:
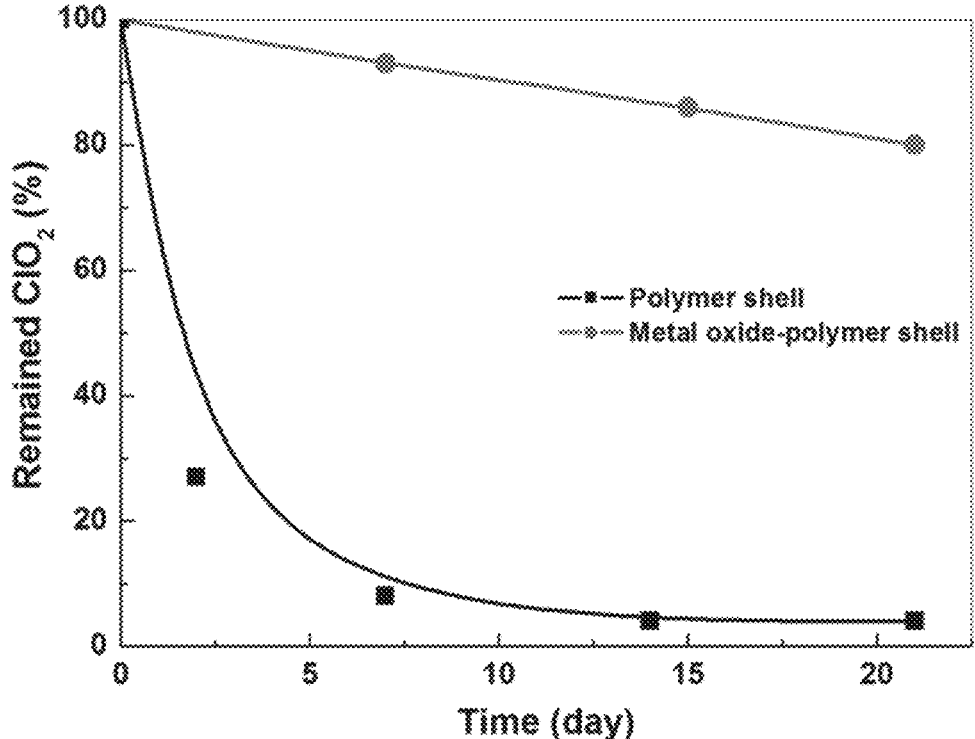
FIG. 15 presents release curves of $ClO_2$ during accelerated life test at 50° C. of the coatings prepared from polymer-encapsulated $ClO_2$ capsules enclosed within outermost polymer and metal oxide-polymer shells.

FIG. 15 compares $ClO_2$ release curves of the coatings prepared from polymer-encapsulated $ClO_2$ capsules enclosed within outmost polymer and metal oxide-polymer shells during an accelerated life test conducted at 50° C. The coating prepared from polymer-encapsulated $ClO_2$ capsules enclosed within outmost $SiO_2$-polymer shells exhibits a basically constant $ClO_2$ release rate at 50° C. for three weeks, while the coating prepared from polymer-encapsulated $ClO_2$ capsules enclosed within outmost polymer shells releases $ClO_2$ rapidly, and less than 10% remained after the first week. It is clear that the addition of metal oxide improves long-term sustained release properties of the coating, even at elevated temperatures.

Figure 16A:
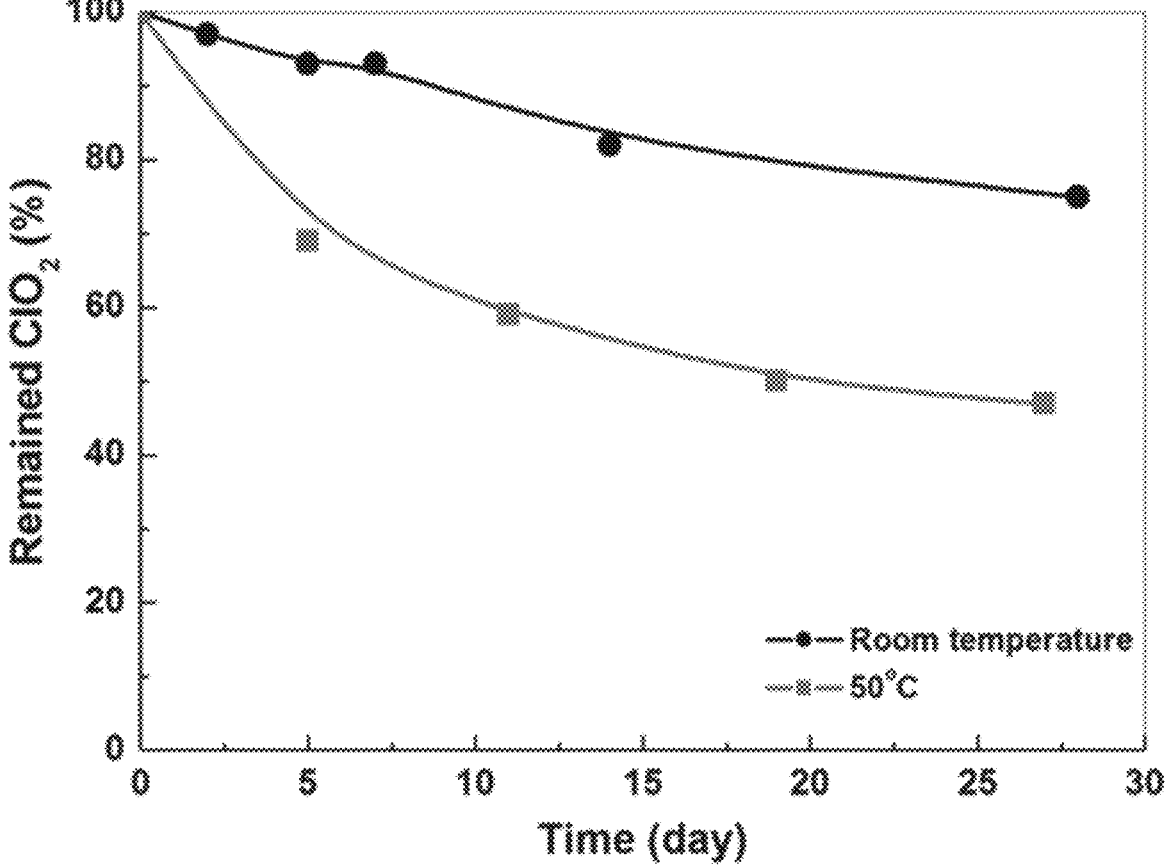
FIG. 16A shows the release curves of a biocide ($ClO_2$) at room temperature and during an accelerated life test at 50° C. of glass slides coated with polymer-encapsulated $ClO_2$ capsules enclosed within outermost metal oxide-polymer shells.
Figure 16B:
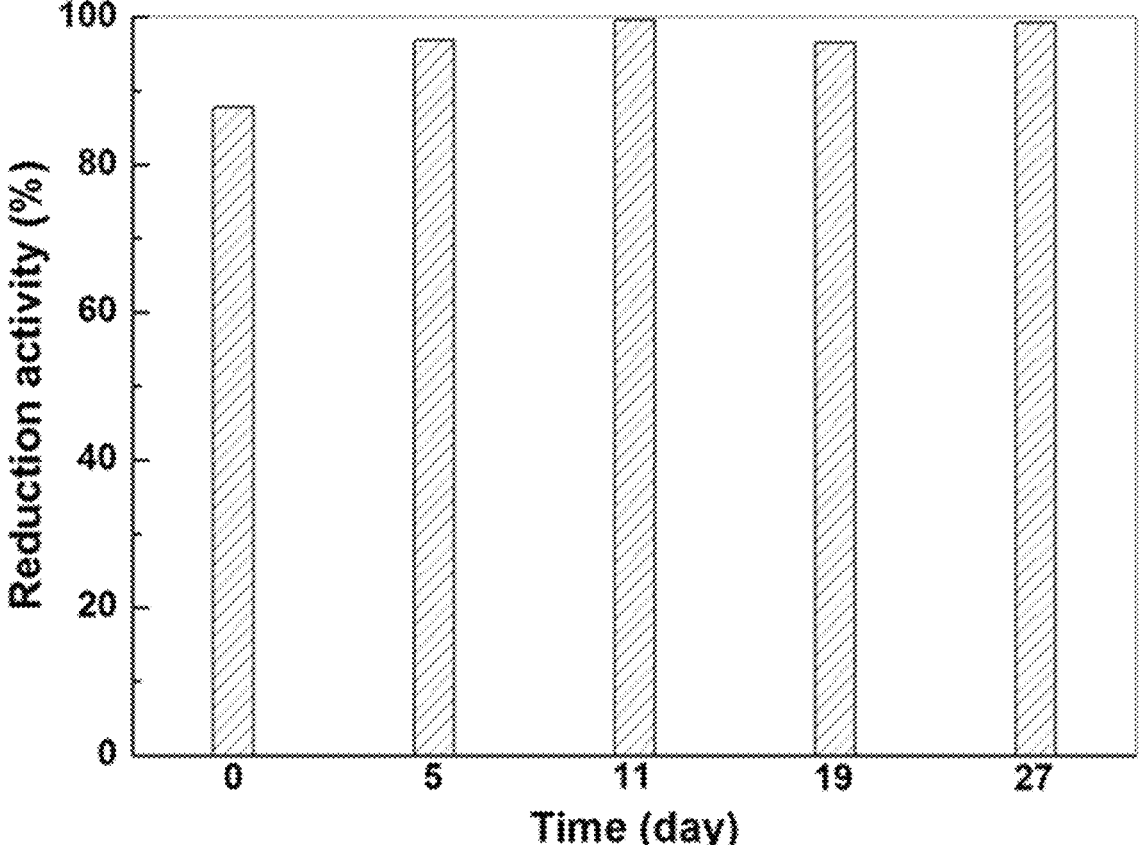
FIG. 16B is a graph showing bactericidal activities against $10^5$ CFU/ml *S. aureus* of the glass slides of FIG. 16A with coatings stored at 50° C. over 27 days.
Figure 17:
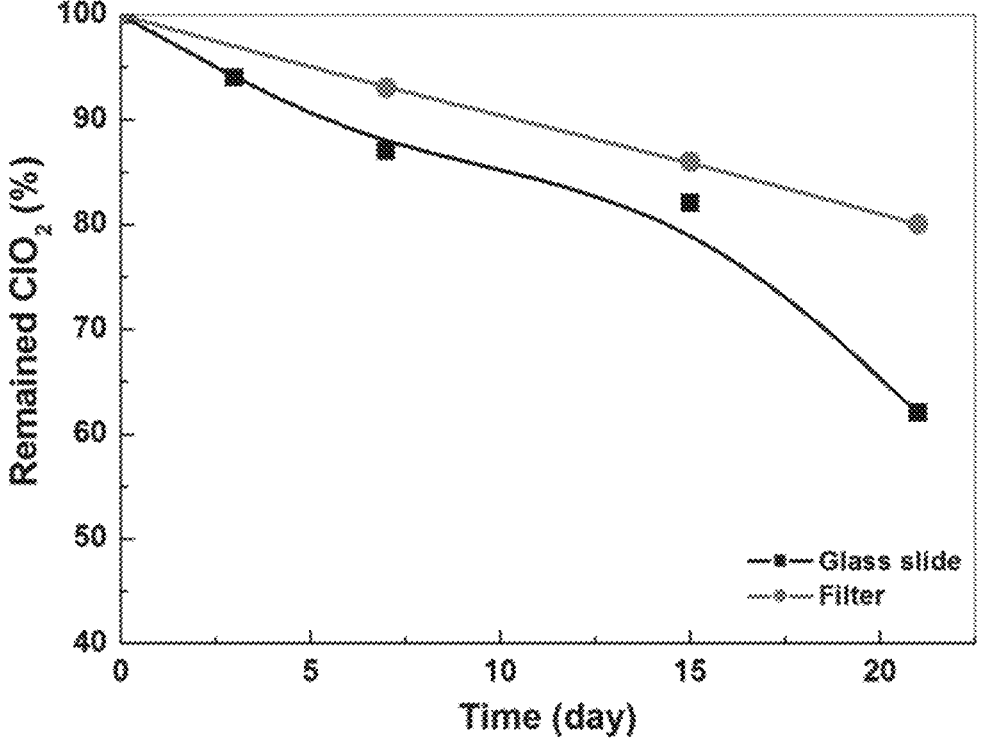
FIG. 17 represents release curves of biocide ($ClO_2$) during accelerated life test at 50° C. of glass slides and HEPA filters coated with polymer-encapsulated $ClO_2$ capsules enclosed within outermost metal oxide-polymer shells.

FIGS. 16A, 16B and 17 show $ClO_2$ release curves of antimicrobial coatings prepared from polymer-encapsulated $ClO_2$ capsules enclosed within outmost metal oxide-polymer shells on different substrates (i.e., a nonporous glass slide and a porous HEPA filter) at different temperatures and long-term antimicrobial activities of antimicrobial coatings stored at 50° C. The average $ClO_2$ release rate of the antimicrobial coating at 50° C. is twice that of room temperature on glass over the four-week test, but the antimicrobial material can maintain better than 95% reduction for $10^5$ CFU/ml *S. aureus*. The release rate of the coated filter and the glass are comparable, except at the $21^{st}$ day.

Figure 18A:
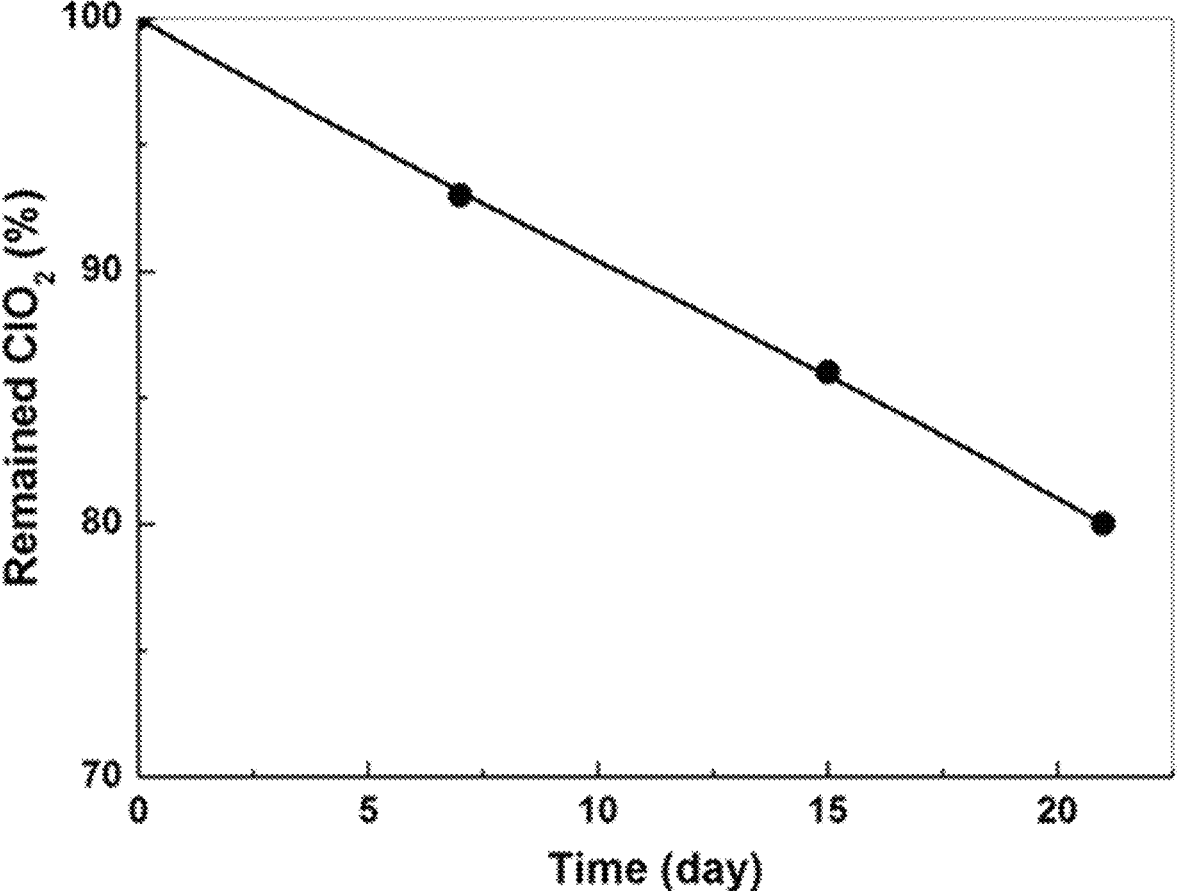
FIG. 18A shows the release curves of a biocide ($ClO_2$) during an accelerated life test at 50° C. of polymer microfibers coated with polymer-encapsulated $ClO_2$ capsules enclosed within outermost metal oxide-polymer shells.
Figure 18B:
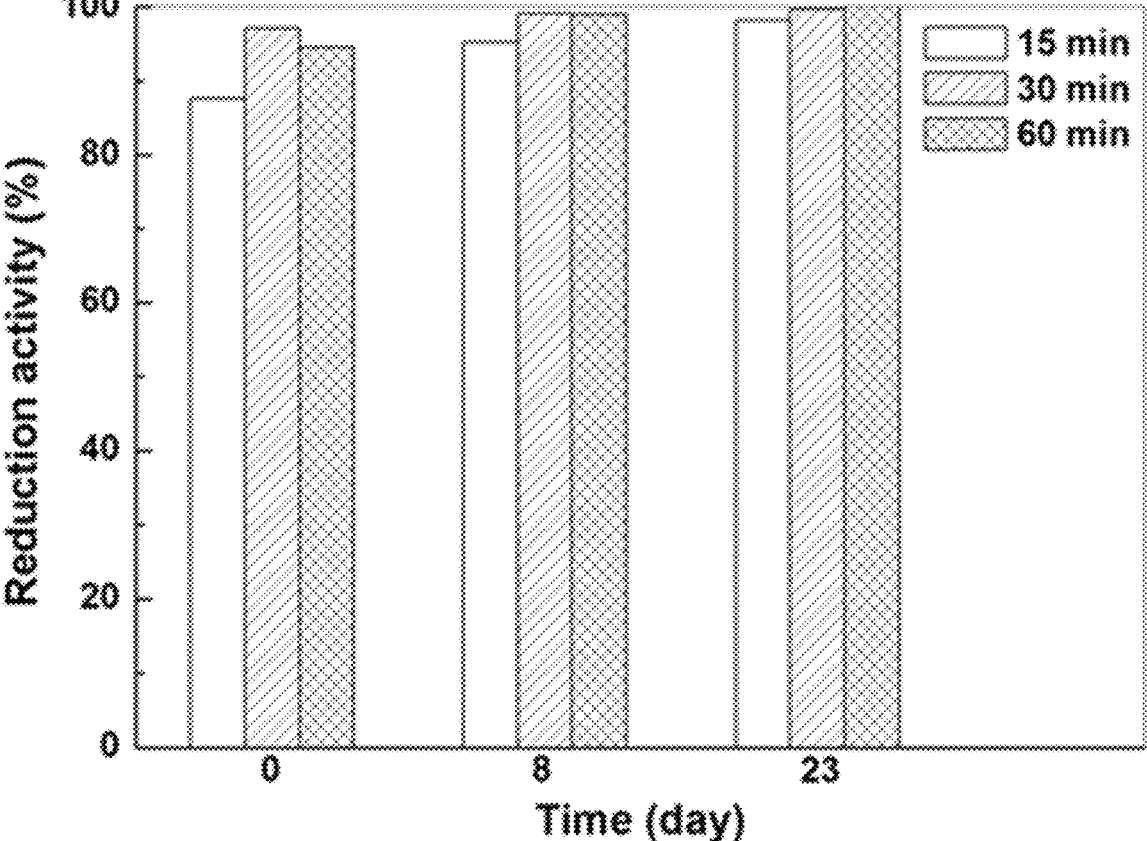
FIG. 18B is a graph showing bactericidal activities against $10^5$ CFU/ml *S. aureus* of the polymer microfibers of FIG. 18A with coatings stored at 50° C. for different contact times (15 minutes, 30 minutes, and 60 minutes).
Figure 19:
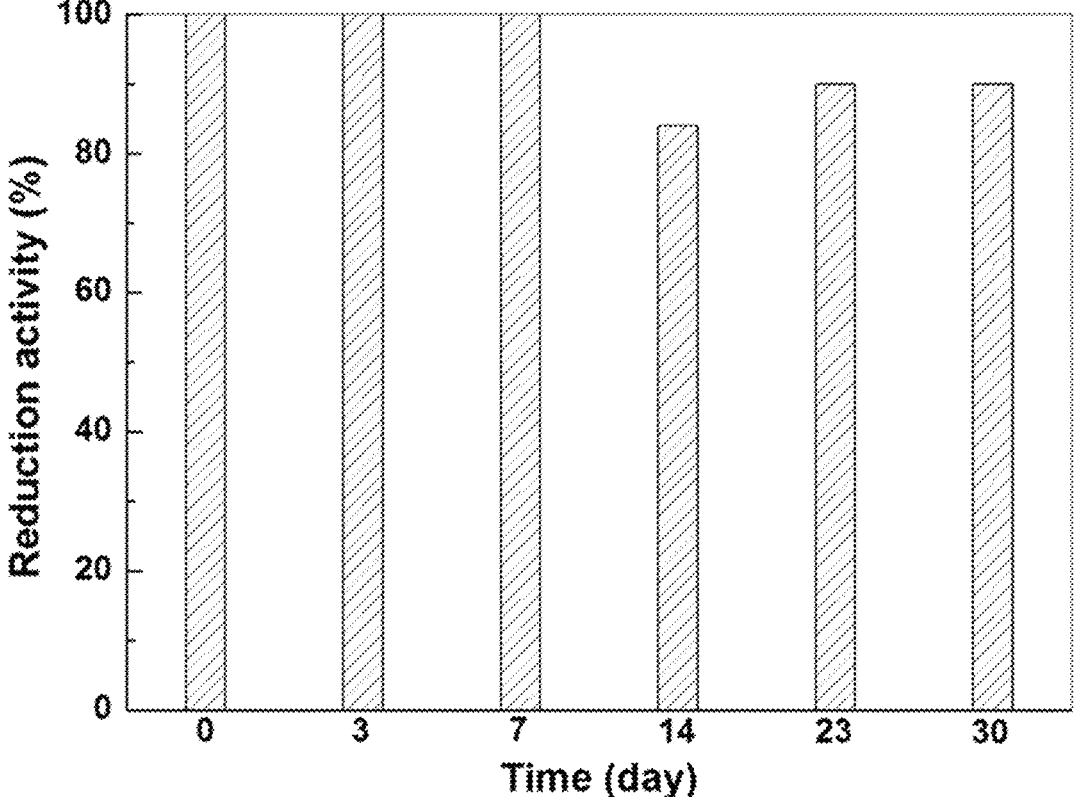
FIG. 19 shows bactericidal activities against $10^5$ CFU/ml *S. aureus* of polymer microfibers coated with thyme oil encapsulated within metal oxide-polymer shells stored at 50° C. after different days.
Figure 20A:
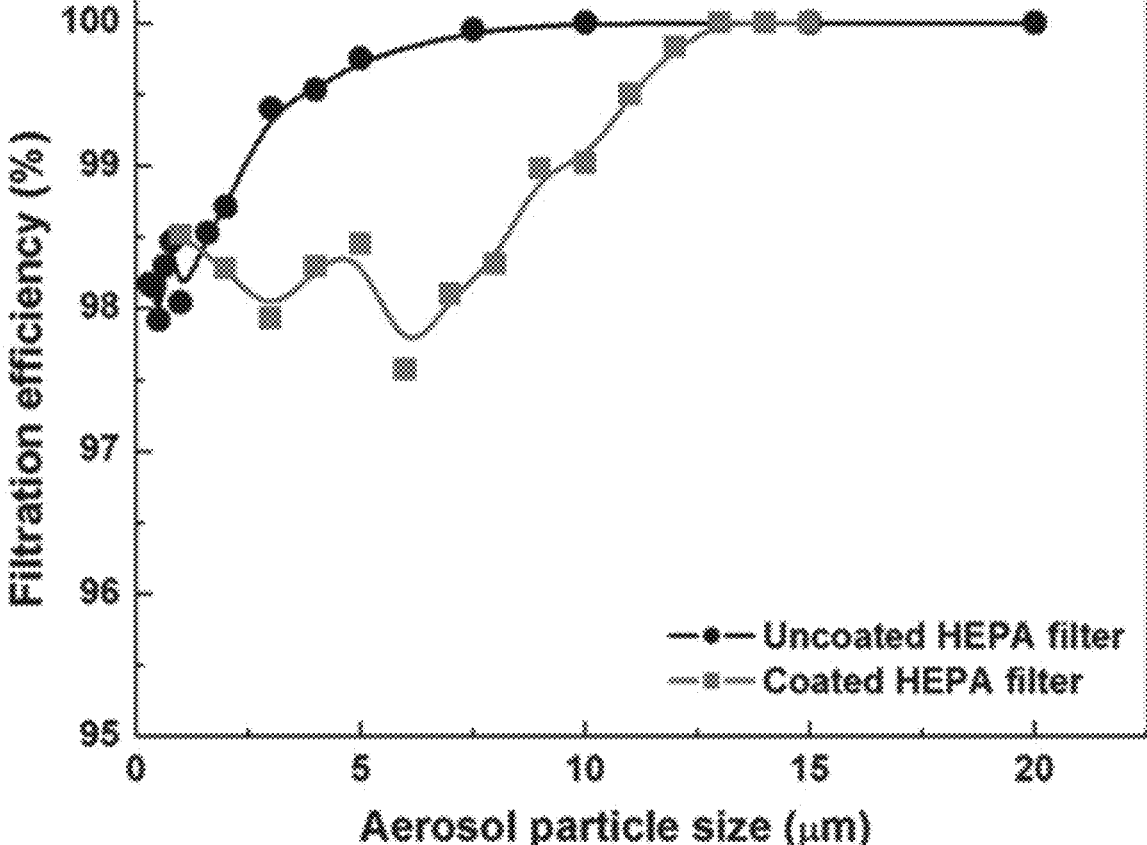
FIG. 20A is a plot showing size-dependent filtration efficiencies for a glycerol aerosol of uncoated HEPA filters and HEPA filters coated with polymer-encapsulated $ClO_2$ capsules enclosed within outermost metal oxide-polymer shells at room temperature.
Figure 20B:
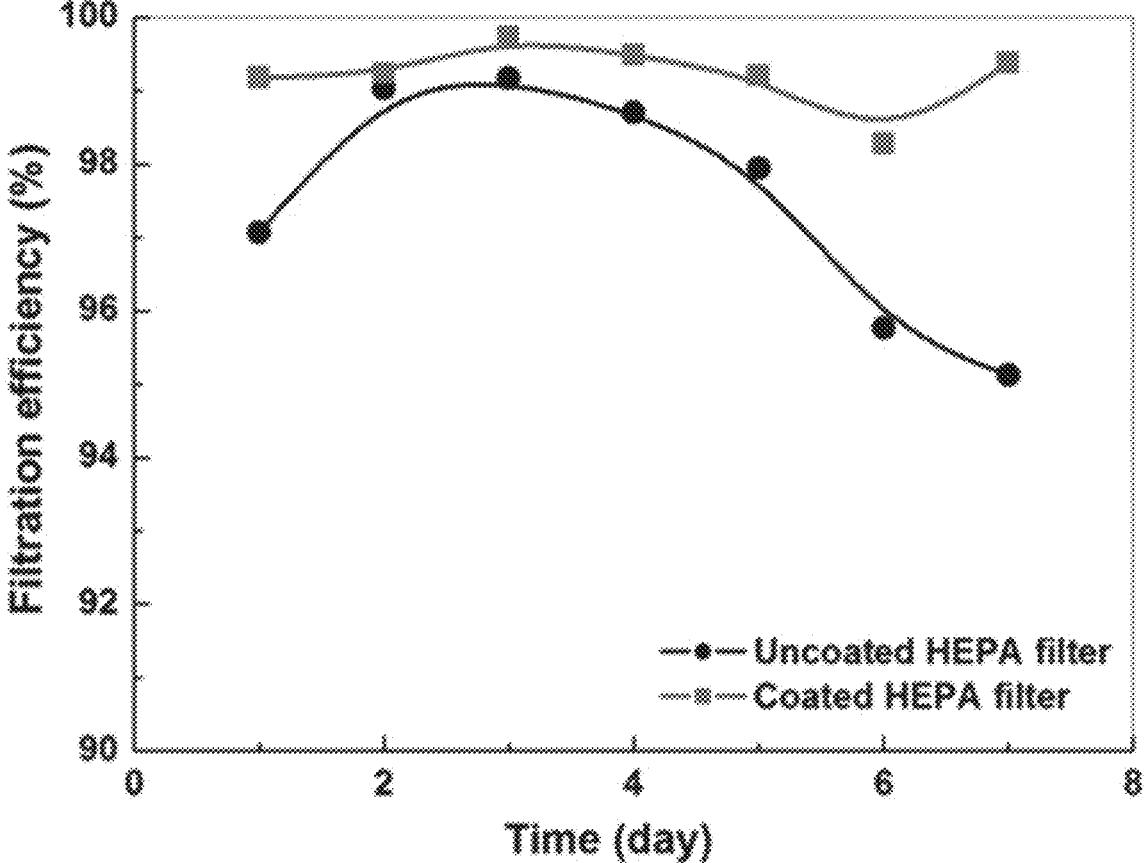
FIG. 20B is a plot showing size-dependent filtration efficiencies for an *E. coli* aerosol of uncoated HEPA filters and HEPA filters coated with polymer-encapsulated $ClO_2$ capsules enclosed within outermost metal oxide-polymer shells at room temperature.
Figure 20C:
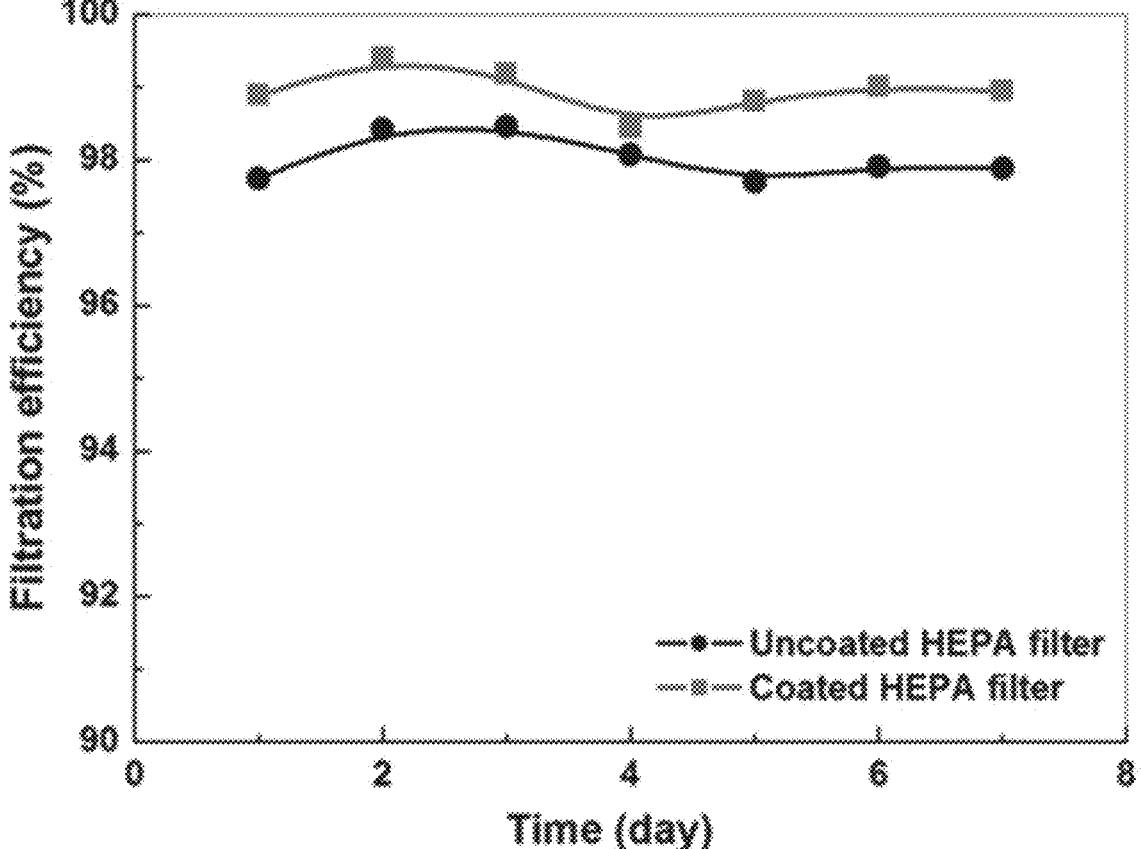
FIG. 20C is a plot showing size-dependent filtration efficiencies for a bacteriophage T4 aerosol of uncoated HEPA filters and HEPA filters coated with polymer-encapsulated $ClO_2$ capsules enclosed within outermost metal oxide-polymer shells at room temperature.
Figure 21A:
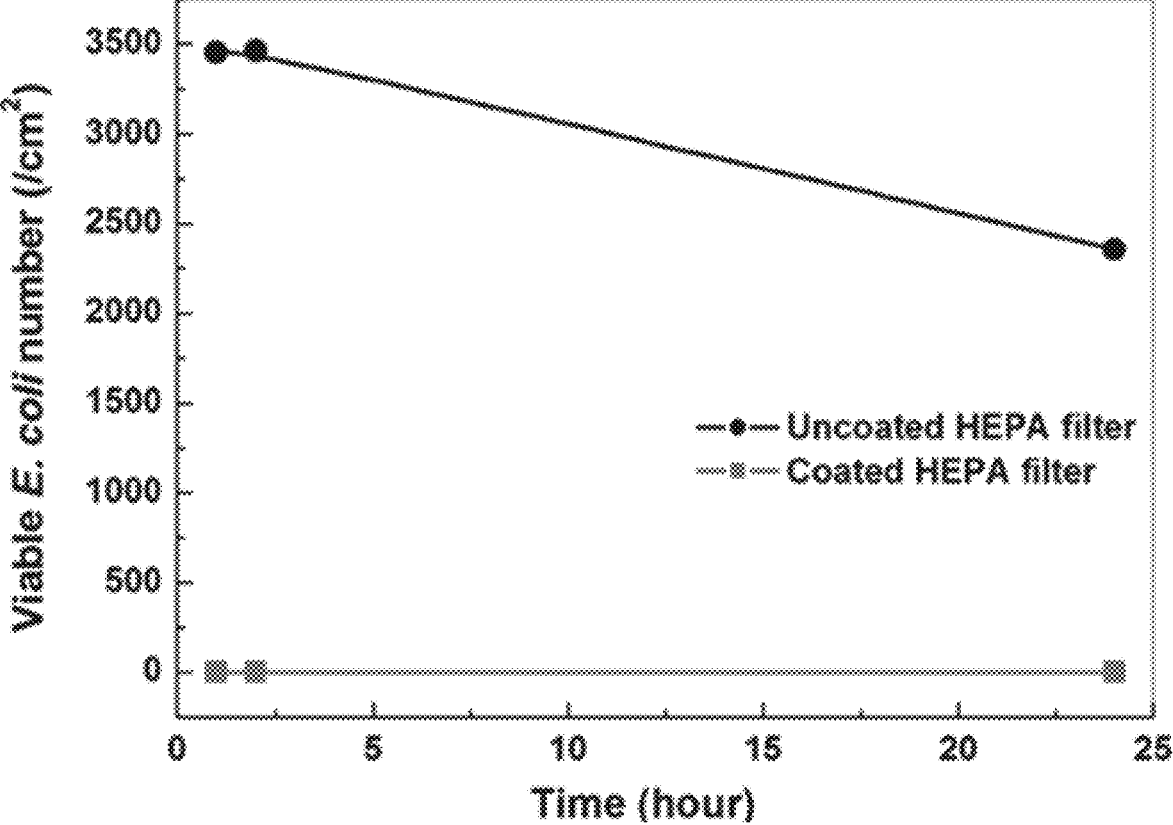
FIG. 21A shows viable *E. coli* numbers after spraying an *E. coli* suspension under real filtration conditions on uncoated HEPA filters and HEPA filters coated with polymer-encapsulated $ClO_2$ capsules enclosed within outermost metal oxide-polymer shells after different times.
Figure 21B:
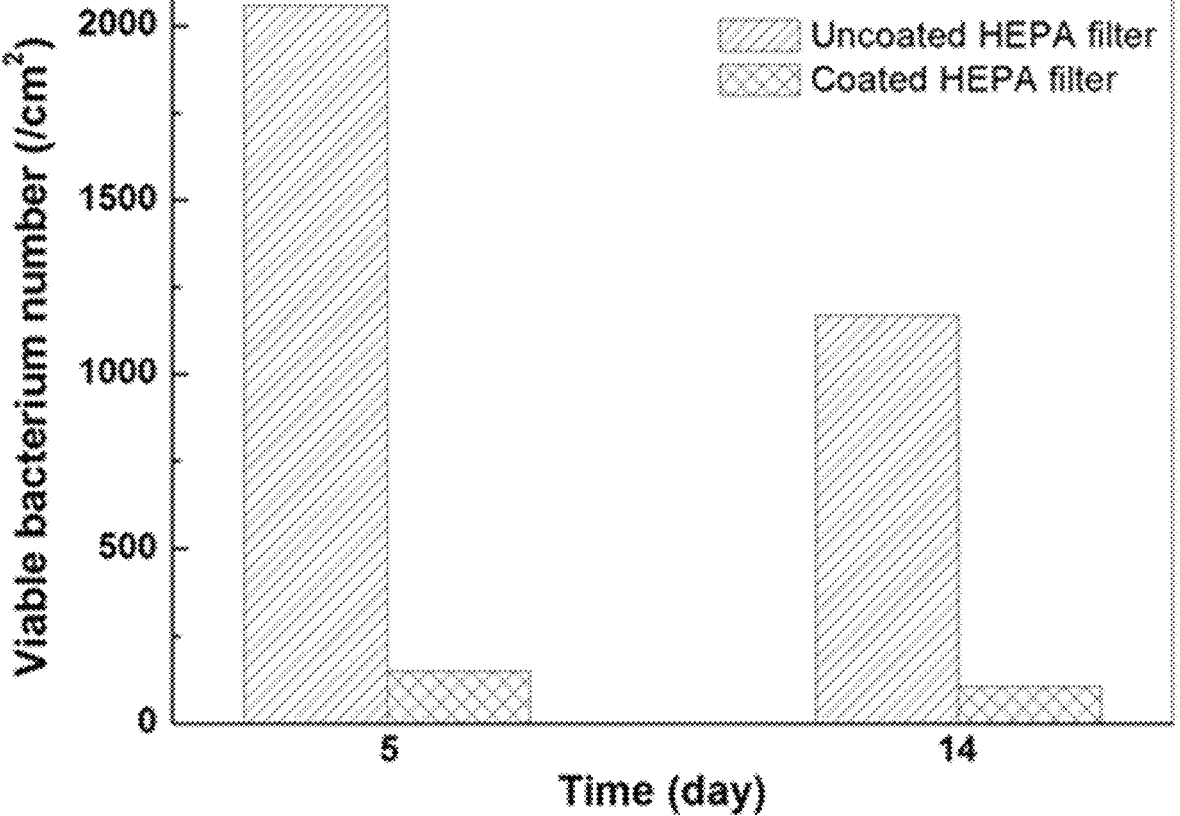
FIG. 21B shows viable bacterium numbers after spraying an *E. coli* suspension under real filtration conditions on uncoated HEPA filters and HEPA filters coated with polymer-encapsulated $ClO_2$ capsules enclosed within outermost metal oxide-polymer shells after different times.

FIGS. 18A, 18B and 19 show long-term antimicrobial activities of a filter made of polymer microfibers coated with the emulsions of capsule-in-capsule (i.e., polymer-encapsulated $ClO_2$) and capsule (i.e., thyme oil) enclosed within $SiO_2$-polymer shells stored at 50° C. FIG. 18A plots the $ClO_2$ remaining in the coating at 50° C. A constant dosing rate of 0.95% $ClO_2$ per day was maintained with a better than 95% reduction of $10^5$ CFU/ml *S. aureus*. Compared to the samples of capsule-in-capsule, polymer microfibers coated with thyme oil capsules enclosed within $SiO_2$-polymer shells attained 100% reduction of $10^5$ CFU/ml *S. aureus* during the first week and maintained bactericidal activities of 84%-90% in the remaining time. This suggests that a double encapsulation can provide a better long-term sustained performance.

FIGS. 20A-20C and FIGS. 21A and 21B show filtration efficiencies for glycerol aerosol, *E. coli* aerosol and bacteriophage T4 aerosol, and viable bacterium numbers under laboratory-test conditions and real filtration conditions of an uncoated HEPA filter and a HEPA filter coated with polymer-encapsulated $ClO_2$ capsules enclosed within metal oxide-polymer shells, respectively. After coating with a capsule-in-capsule emulsion, the HEPA filter exhibits slightly decreased filtration efficiencies for the glycerol aerosol with a particle size of below 15 micrometers, however, the filtration efficiencies for the *E. coli* aerosol and the bacteriophage T4 aerosol are better. After spraying for 24 hours of challenging the filters with the *E. coli* suspension, 68% of *E. coli* remains viable on the uncoated HEPA filters, while no viable *E. coli* can be cultured from the coated HEPA filters. Under real filtration conditions, viable bacterium numbers can be kept below 9% compared to that of uncoated HEPA filters, even after 14 days of continuous operation.

Figure 22A:
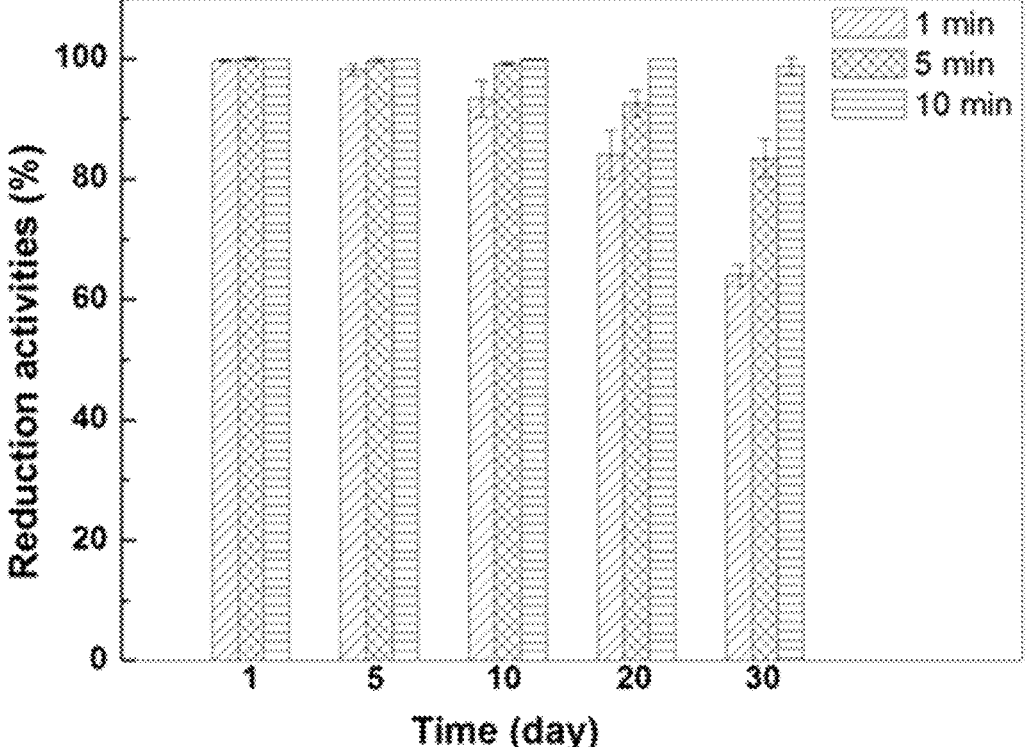
FIG. 22A shows long-term virucidal activities against $10^8$ PFU/ml H1N1 for different contact times (1 minute, 5 minutes, and 10 minutes) of HEPA filters coated with polymer-encapsulated $ClO_2$ capsules enclosed within outermost metal oxide-polymer shells at room temperature.
Figure 22B:
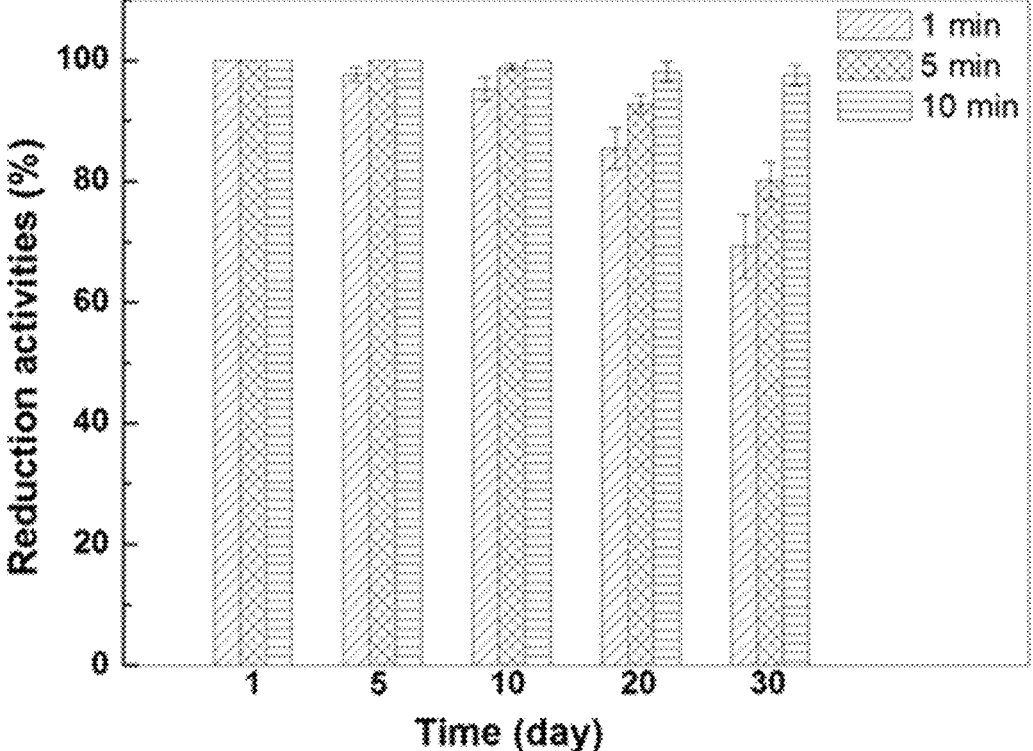
FIG. 22B shows long-term virucidal activities against $10^8$ PFU/ml H3N2 for different contact times (1 minute, 5 minutes, and 10 minutes) of HEPA filters coated with polymer-encapsulated $ClO_2$ capsules enclosed within outermost metal oxide-polymer shells at room temperature.
Figure 22C:
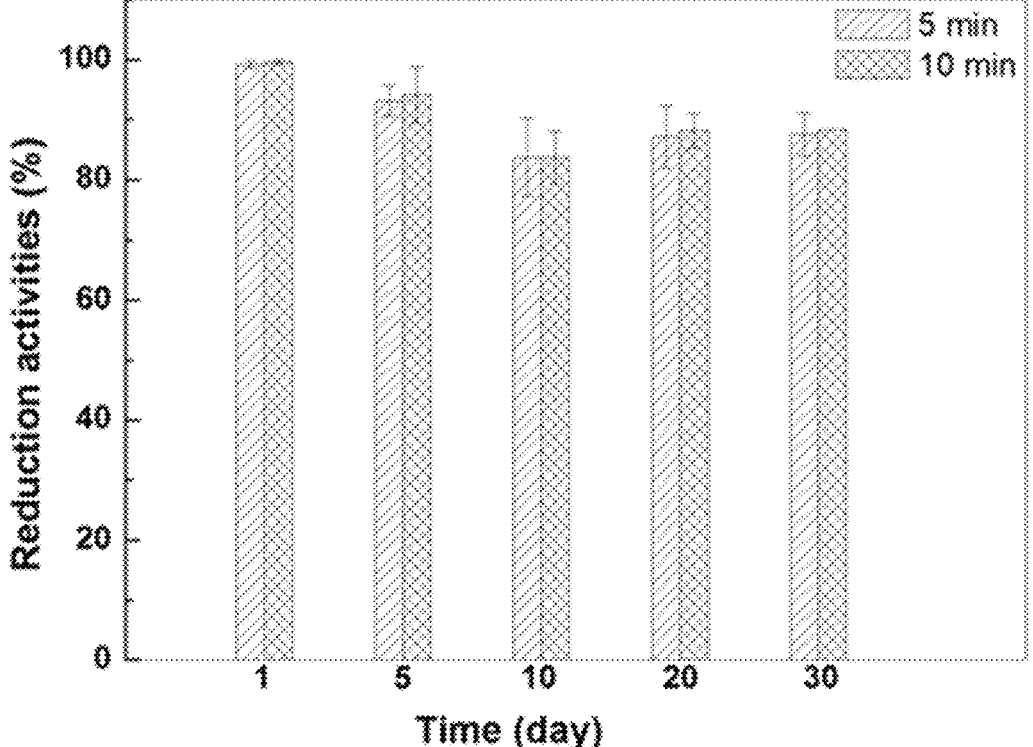
FIG. 22C shows long-term virucidal activities against $10^8$ PFU/ml Enterovirus 71 for different contact times (1 minute, 5 minutes, and 10 minutes) of HEPA filters coated with polymer-encapsulated $ClO_2$ capsules enclosed within outermost metal oxide-polymer shells at room temperature.

Multi-level antimicrobial activities of antimicrobial coatings are believed to contribute to better filtration efficiencies for bacterium and virus (i.e., bacteriophage) aerosols and inhibit the growth of bacteria on HEPA filters. Table 1 and FIGS. 22A-22C show bactericidal and long-term virucidal activities of HEPA filters coated with polymer-encapsulated $ClO_2$ capsules enclosed within metal oxide-polymer shells. Fresh coated HEPA filters exhibit wide-spectrum antimicrobial activities of above 99% reduction for $10^6$ CFU/ml gram negative and gram positive bacteria. After 30 days, the coated HEPA filters still retain excellent antimicrobial activities of above 97% reduction for $10^8$ PFU/ml influenza viruses, and moderate antimicrobial activities of above 80% reduction for $10^8$ PFU/ml Enterovirus 71.

TABLE 1

| Gram negative | Reduction | Gram positive | Reduction |
|---|---|---|---|
| Multidrug-resistant *Pseudomonas* | 99.79% | *Enterococcus faccium* | 99.85% |
| *Pseudomonas putida* | 99.28% | | |
| *Legionella pneumophilia* | 99.94% | | |
| *Chryseobacterium indologenes* | 99.86% | | |
| *Serratia marcescens* | 99.51% | | |
| *Klebsilla pneumonia* | 99.63% | | |
| *Enterobacter aerogenus* | 99.84% | | |
| *Stenotrophomonas maltophilia* | 99.93% | | |

Table 1 above shows the bactericidal activities against $10^6$ CFU/ml gram negative and gram positive bacteria with a contact time of 10 minutes of HEPA filters coated with polymer-encapsulated $ClO_2$ capsules enclosed within outermost metal oxide-polymer shells.

EXAMPLES

Example 1

Sodium chlorite powder was dissolved in 50 ml of distilled deionized water to prepare sodium chlorite solution with a concentration of 0.1 wt % to 40 wt %. The sodium chlorite solution was then mixed with 0.1 g to 2 g of 30 wt % hydrogen peroxide.

Example 2

Sodium chlorite powder was dissolved in 50 ml of distilled deionized water to prepare sodium chlorite solution with a concentration of 0.1 wt % to 40 wt %. The sodium chlorite solution was then mixed with 0.01 ml to 10 ml of 3% to 8% sodium hypochlorite or potassium hypochlorite solution.

Example 3

Sodium chlorite powder was dissolved in 50 ml of distilled deionized water to prepare sodium chlorite solution with a concentration of 0.1 wt % to 40 wt %. The sodium chlorite solution was then mixed with solutions containing metal ions ($Cu^{2+}$, $Zn^{2+}$ Ag®). The final concentration of metal ions ranged from 30 ppm to 3,000 ppm.

Example 4

Sodium chlorite powder was dissolved in 50 ml of distilled deionized water to prepare sodium chlorite solution with a concentration of 0.1 wt % to 40 wt %. The sodium chlorite solution was then mixed with a metal micro-particle and/or nano-particle suspension (copper, zinc, silver). The final concentration of metal particles dispersed into solution ranges from 30 ppm to 30,000 ppm.

Example 5

Sodium chlorite powder was dissolved in 50 ml of distilled deionized water to prepare sodium chlorite solution with a concentration of 0.1 wt %4 to 40 wt %. The sodium chlorite solution was then mixed with peracetic acid. The final concentration of peracetic acid ranged from 0.01 ppm to 10 ppm.

Example 6

Very small particles (VSP) mixtures were prepared from one or more phytochemicals including essential oils, e.g., a mix of thyme oil and tea tree oil, or a mix of thymol (active component of thyme oil) and terpinen-4-oil (active component of tea tree oil).

Example 7

One or more of the components from Example 6 were mixed with 50% to 100% alcohols to form a VSP-alcohol mixture. The final concentration of VSP in the mixture varied from 0.1% to 50%.

Example 8

One or more of the components from Example 6 were mixed with aromatic compounds, such as 1% to 10% chloroxylenol solution. The final concentration of VSP in the mixture varied from 0.1% to 50%.

Example 9

One or more of the components from Example 6 were mixed with solutions containing metal ions ($Cu^{2+}$, $Zn^{2+}$ $Ag^+$). The final concentration of metal ions ranged from 30 ppm to 3,000 ppm.

Example 10

One or more of the components from Example 6 were mixed with metal micro-particle and/or nano-particle suspensions, such as copper, zinc, silver. The final concentration of metal particles dispersed into solution ranged from 30 ppm to 30,000 ppm.

Example 11

The biocide mixture from Examples 1-5 was encapsulated within a polymer shell (polyethylene glycol (PEG) with a molecular weight of 400 to 40,000, polyvinyl alcohol (PVA) with a molecular weight of 31,000 to 186,000, polyvinyl pyrrolidone (PVP) with a molecular weight of 10,000 to 360,000, polyethylenimine (PEI) with a molecular weight of 1,200 to 60,000, PEO-PPO-PEO with the molecular weight of 1,000 to 8,000, and a combination of two or more thereof). The polymer shell was formed by adding the biocide mixture dropwise into the polymer solution under vigorous stirring. The emulsion can also be ultrasonically-treated for 1 minute.

Example 12

The biocide mixture from Examples 6-10 was encapsulated within a polymer shell (PEG with a molecular weight of 400 to 40,000, PVA with a molecular weight of 31,000 to 186,000, PVP with a molecular weight of 10,000 to 360,000, PEI with a molecular weight of 1,200 to 60,000, PEO-PPO-PEO with a molecular weight of 1,000 to 8,000). The polymer shell was formed by adding the biocide mixture dropwise into the polymer solution under vigorous stirring. The emulsion was then ultrasonic-treated for 1 minute.

Example 13

Sodium silicate solution (2.88 g) was diluted with double deionized (DDI) water to obtain 40 ml of sodium silicate solution with 0.25 mol/l NaOH and 0.32 mol/l $SiO_2$. Diluted nitric acid (1 mol/l, 8.20 ml) was added dropwise into the diluted sodium silicate solution under vigorous stirring to obtain acidic silica sol with a pH value of 4.

Example 14

Sodium silicate solution (2.88 g) was diluted with DDI water to obtain 40 ml sodium silicate solution with 0.25 mol/l NaOH and 0.32 mol/l $SiO_2$. Diluted nitric acid (1 mol/l, 15.56 ml) was added dropwise into the diluted sodium silicate solution under vigorous stirring to obtain acidic silica sol with a pH value of 1.

Example 15

Sodium silicate solution (2.00 g) was mixed with DDI water (52 g), followed by adding diluted hydrochloric acid (1 mol/l, 7.24 ml) dropwise under vigorous stirring to obtain acidic silica sol with a pH value of 6.

Example 16

Commercially obtained dispal boehmite sol (20 wt %) was diluted with DDI water to obtain alumina sol with a concentration of 1-15 wt %.

Example 17

Titanium isopropoxide (10 ml) was dissolved in isopropanol (23.6 ml), followed by adding $HNO_3$ (2 mol/l, 3.4 ml) and DDI water (31.4 ml) under vigorous stirring to obtain an opaque suspension. The suspension was further stirred at 80° C. to evaporate the isopropanol and to peptize the titania precipitate. This was followed by cooling down to room temperature and stirring overnight to obtain a clear titania sol (1 mol/l).

Example 18

Copper (II) nitrate was dissolved in DDI water, followed by adding sodium citrate aqueous solution to prepare copper (II) citrate complex sol or aqueous suspension, depending on the concentrations of copper (II) nitrate and sodium citrate. The obtained copper (II) citrate complex aqueous suspension was further filtered to obtain a clear copper (II) citrate complex sol.

Example 19

Titanium(IV) tetrabutoxide (4.8 g) was hydrolyzed with DDI water (100 ml). The obtained titanium hydroxide precipitate was washed thoroughly with DDI water, and dissolved in hydrogen peroxide (30 wt %, 75 ml) to obtain a transparent orange titanium peroxo-complex sol. The sol was diluted with water to obtain the solution with different concentrations.

Example 20

Zinc sulfate was dissolved in DDI water, followed by the addition of sodium hydroxide solution with a slightly lower stoichiometric ratio to prepare a zinc hydroxide precipitate. The obtained zinc hydroxide precipitate was washed with DDI water and redispersed in a citric acid aqueous solution. The obtained mixture was further stirred overnight and filtered to obtain a clear zinc citrate complex sol.

Example 21

Silver nitrate was dissolved in DDI water in a brown bottle, followed by adding an ascorbic acid aqueous solution under vigorous stirring to obtain a silver/silver-ascorbic acid complex sol.

Example 22

The biocide mixture from Examples 6-10 was added dropwise into a mixed suspension/solution containing a polymer used in Examples 11 and 12 and an inorganic material (Examples 13-21) under vigorous stirring. The mixture was then ultrasonic-treated for 1 minute to form an inorganic-organic shell.

Example 23

The biocide mixture from Examples 6-10 was added dropwise into a mixed solution containing a polymer used in Examples 11 and 12 and a metal alkoxide under vigorous stirring. The mixture was then ultrasonic-treated for 1 minute to form an inorganic-organic shell by a hybrid of the inorganic network interpenetrating the organic network.

Example 24

The biocide mixture from Examples 6-10 was added dropwise into a polymeric organosilicon (e.g., polydimethylsiloxane) under vigorous stirring. The mixture was ultrasonic-treated for 1 minute to form an inorganic-organic shell formed by a molecularly mixed inorganic-organic network.

Example 25

The polymer-encapsulated biocide from Examples 11 and 12 was added dropwise into a secondary polymer solution under vigorous stirring. The secondary polymer can be the PEG, PVA, PVP, PEI or PEO-PPO-PEO used in Examples 11 and 12 and a combination of two and more thereof. The mixture was then ultrasonic-treated for 1 minute to form capsule-in-capsule encapsulation with an innermost polymer shell and an outermost polymer shell.

In FIGS. 7 and 12B, the 0 wt % $SiO_2$ sample was a PEO-PPO-PEO-encapsulated biocide (biocide from Example 3, encapsulation from Example 11) with an outermost PEO-PPO-PEO shell (Example 25). Various wt % $SiO_2$ samples were PEO-PPO-PEO-encapsulated biocide (biocide from Example 3, encapsulation from Example 11) with an outermost $SiO_2$-PEO-PPO-PEO shell (Example 27). The addition of $SiO_2$ improved the long-term $ClO_2$ release property without lowering the antimicrobial activity.

Example 26

The encapsulated biocide from Examples 22-24 was added dropwise into a secondary polymer solution under vigorous stirring. The secondary polymer can be PEG, PVA, PVP, PEI or PEO-PPO-PEO. The mixture was then ultrasonic-treated for 1 minute to form an inorganic-organic inner shell with an outermost organic shell.

Example 27

The encapsulated biocide from Examples 11 and 12 was added dropwise into a mixed suspension/solution containing a polymer used in Examples 11 and 12 and an inorganic material (Examples 13-21) involved in Example 22, a mixed solution containing a polymer used in Examples 11 and 12, a metal alkoxide involved in Example 23, and a polymeric organosilicon involved in Example 24 under vigorous stirring. The mixture was then ultrasonic-treated for 1 minute to form an innermost organic shell and an outmost inorganic-organic shell.

Example 28

The encapsulated biocide from Examples 22-24 was added dropwise into a mixed suspension/solution containing a polymer used in Examples 11 and 12 and an inorganic material (Examples 13-21) in Example 22, a mixed solution containing a polymer used in Examples 11 and 12, a metal alkoxide involved in Example 23, and a polymeric organosilicon involved in Example 24 under vigorous stirring. The mixture was then ultrasonic-treated for 1 minute to form an innermost inorganic-organic shell and an outermost inorganic-organic shell.

Example 29

A material according to any of the above Examples was wiped/brushed uniformly onto porous materials and porous media, followed by drying in a fume hood. The brushing and drying processes were repeated several times to reach the expected loading.

Example 30

A material according to any of the above Examples was cast on porous materials and porous media, followed by drying in a fume hood. The volume of emulsion is ca. 600 ml per square meter of porous materials and porous media.

Example 31

Porous materials and porous media were first immersed into a material according to any of the above Examples for 30 seconds, followed by removal at a constant rate (typically 1 mm/s) and drying in a fume hood.

Example 32

A material according to any of the above Examples was added on spinning porous materials and porous media to obtain the antimicrobial coating. A typical spinning speed is 1,000 rpm.

Example 33

A material according to any of the above Examples was distributed uniformly on porous materials and porous media through a spray nozzle to obtain the antimicrobial coating.

Example 34

Porous materials and porous media with the present antimicrobial coating prepared according to Examples 28-32 were cut into small pieces with a diameter of 15 mm. Then, these pieces were placed into flasks with a mixture of potassium iodide solution (2.5% w/v, 40 ml) and sulphuric acid solution (50 wt %, 1 ml). The flasks were kept in the dark for 10 minutes, followed by titration with sodium thiosulphate solution (0.001 mol/1) until the color changed to light yellow. Starch solution (0.5% w/v, 1 ml) was added to the flasks as an indicator. Titration was continued with sodium thiosulphate solution (0.001 mol/1) until the color changed from blue to colorless. The remaining $ClO_2$ amounts within the porous materials and porous media with the antimicrobial coating were calculated according to the volume of consumed sodium thiosulphate solution.

Example 35

Separate bacterium/mold suspensions (0.1 ml) were inoculated on tryptone soya agar plates. Porous materials and porous media with the antimicrobial coating were cut into pieces with a 15 mm diameter and placed on the centers of the inoculated plates. The plates were incubated at room temperature for 96 hours (*Cladosporium*) or for 48 hours (*E. coli*, MRSA and *S. aureus*), respectively. The inhibition zone size was calculated from the radius of the clear annulus without a mold or bacterial colony.

Example 36

Separate bacterium suspensions (0.1 ml) were spread evenly on glass slides, porous materials and porous media without/with the antimicrobial coating for different times. Then the slides, porous materials and porous media were immersed in a culture tube containing neutralizer (20 ml) for 30 minutes to stabilize and wash off the still surviving bacteria from the surface. The neutralizer solutions collecting bacteria were inoculated on tryptone soya agar plates for viable culturing. The plates were incubated at 37° C. for 24 hours. The viable bacteria were enumerated from formed colony numbers.

Separate virus suspensions (0.1 ml) were spread evenly on HEPA filters without/with antimicrobial coatings for different times. Then the HEPA filters were immersed in a culture tube containing neutralizer (20 ml) for 30 minutes to stabilize and wash off the still surviving virus from the surface. The plaque assay (Madin-Darby canine kidney cell line for H1N1 and H3N2 influenza viruses, Buffalo green monkey epithelial cell line for Enterovirus 71) was performed to determine viable virus concentration.

It is to be understood that the antimicrobial coating material for surface coating is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. An antimicrobial coating material for surface coating, comprising:
   (a) biocides comprising at least one antimicrobial component selected from the group consisting of chlorine dioxide, hydrogen peroxide, peroxy acids, alcoholic compounds, phenolic compounds, essential oils, antimicrobial components of essential oils, bleach, antimicrobial phytochemicals, and combinations thereof; and
   (b) inorganic-organic shells permeable to the biocides, comprising:
      inorganic materials selected from the group consisting of titania sol, titanium peroxo complex sol, silica sol, alumina sol and combinations thereof; and
      organic materials comprising at least one nonionic polymer,
   wherein the inorganic-organic shells encapsulate and contain the biocides to form capsule structures for storage and release of the biocides,
   wherein the inorganic materials are present in a concentration of 0.5-95 wt % of the inorganic-organic shells,
   wherein structures of the inorganic-organic shells comprise a multi-layered structure, and
   wherein the multi-layered structure comprises more than one layer of the organic materials sandwiched between adjacent layers of the inorganic materials.

2. The antimicrobial coating material for surface coating according to claim 1, wherein the essential oil is selected from the group consisting of agarwood oil, cajuput oil, cananga oil, cinnamon bark oil, citronella oil, clove oil, eucalyptus oil, fennel oil, ginger oil, kaffir lime oil, nutmeg oil, olliumxanthorrhiza oil, origanum oil, patchouli oil, rosemary oil, sandalwood oil, tea tree oil, thyme oil, vetiver oil and combinations thereof.

3. The antimicrobial coating material for surface coating according to claim 2, wherein the essential oil is diluted in a solvent selected from the group consisting of ethylene glycol, propylene glycol, glycerol, dipropylene glycol, polyethylene glycol, and combinations thereof.

4. The antimicrobial coating material for surface coating according to claim 1, wherein the at least one nonionic polymer is selected from the group consisting of polyethylene glycol, polyvinyl alcohol, polyvinylpyrrolidone, polyetherimide, and polyethyleneimine.

5. The antimicrobial coating material for surface coating according to claim 1, wherein the at least one nonionic polymer is selected from the group consisting of poly (ethylene oxide)-poly (propylene oxide)-poly (ethylene oxide), and poly (ethylene glycol)-poly (propylene glycol)-poly (ethylene glycol).

6. The antimicrobial coating material for surface coating according to claim 1, further comprising at least one additional nonionic polymer, the at least one additional nonionic polymer being selected from the group consisting of polyethylene glycol, polyvinyl alcohol, polyvinylpyrrolidone, polyetherimide, polyethyleneimine, poly (ethylene oxide)-poly (propylene oxide)-poly (ethylene oxide), and poly (ethylene glycol)-poly (propylene glycol)-poly (ethylene glycol) and combinations thereof.

7. A method of producing an antimicrobial coated material for application to porous materials or porous media, comprising the steps of:

(a) preparing a biocide mixture comprising at least one antimicrobial component selected from the group consisting of chlorine dioxide, hydrogen peroxide, peroxy acids, alcoholic compounds, phenolic compounds, essential oils, antimicrobial components of essential oils, bleach, antimicrobial phytochemicals, and combinations thereof;

(b) preparing a suspension or a solution of nonionic polymers and inorganic materials, wherein the inorganic materials are selected from the group consisting of metal oxides, metal complexes, metal salts, metal particles and combinations thereof;

(c) preparing a stable sol suspension comprising the biocide mixture encapsulated within inorganic-organic shells, wherein the inorganic-organic shells comprise the suspension or the solution of the nonionic polymer and the inorganic material, wherein the stable sol suspension forms an antimicrobial coating material, wherein the inorganic-organic shells are permeable to the biocide mixture, the inorganic material being selected from the group consisting of titania sol, titanium peroxo complex sol, silica sol, alumina sol and combinations thereof, organic materials of the inorganic-organic shells comprising the nonionic polymers, wherein the inorganic-organic shells encapsulate and contain the biocide mixture to form capsule structures for storage and release of the biocide mixture, wherein the inorganic material is present in a concentration of 0.5-95 wt % of the inorganic-organic shells, wherein structures of the inorganic-organic shells comprise a multi-layered structure, and wherein the multi-layered structure comprises more than one layer of the organic materials sandwiched between adjacent layers of the inorganic materials; and (d) applying the antimicrobial coating material on a porous material or in a porous medium to form an antimicrobial coated material.

8. The method according to claim 7, wherein the step of preparing the stable sol suspension comprises preparing a metal oxide sol from a water-soluble metal salt, metal alkoxide or commercial colloidal metal oxide.

9. The method according to claim 7, wherein the step of preparing the stable sol suspension comprises preparing a metal complex sol from a water-soluble metal salt and metal hydroxide.

10. The method according to claim 7, wherein during the preparation of the stable sol suspension, the inorganic materials interact with the organic materials to form the inorganic-organic shells.

11. The method of claim 7, wherein the step of applying the antimicrobial coating material comprises at least one of wiping, brushing, casting, dip-coating, spin-coating and spraying the antimicrobial material onto the porous material or the porous medium.

12. The method according to claim 11, wherein the antimicrobial coating material is applied to the porous material, and the porous material is selected from the group consisting of personal protective equipment, household products, clothes and infant products.

13. The method according to claim 11, wherein the antimicrobial coating material is applied to the porous medium, and the porous medium is selected from a porous membrane and a porous filter.

14. The method according to claim 13, wherein the porous medium comprises a material selected from the group consisting of metals, polymers, ceramics and combinations thereof.

* * * * *